United States Patent
Swain et al.

(10) Patent No.: US 7,787,369 B2
(45) Date of Patent: Aug. 31, 2010

(54) FLEXIBLE ETHERNET BRIDGE

(75) Inventors: Tushara Kanta Swain, Bhubaneswar (IN); Brian D. Wilson, Zumbro Falls, MN (US)

(73) Assignee: Texas Instruments Incorporated, Dallas, TX (US)

( * ) Notice: Subject to any disclaimer, the term of this patent is extended or adjusted under 35 U.S.C. 154(b) by 128 days.

(21) Appl. No.: 12/135,610

(22) Filed: Jun. 9, 2008

(65) Prior Publication Data

US 2008/0273459 A1 Nov. 6, 2008

Related U.S. Application Data

(62) Division of application No. 10/684,454, filed on Oct. 15, 2003, now Pat. No. 7,512,078.

(51) Int. Cl.
*H04L 12/26* (2006.01)
*H04L 12/28* (2006.01)

(52) U.S. Cl. .................. 370/229; 370/390; 370/392; 370/401

(58) Field of Classification Search ......... 370/229–235, 370/252–256, 389, 390, 392, 395.42, 401
See application file for complete search history.

(56) References Cited

U.S. PATENT DOCUMENTS

| 5,914,938 A | * | 6/1999 | Brady et al. | ................ 370/254 |
| 6,456,962 B1 | * | 9/2002 | Allingham et al. | ............ 703/26 |
| 6,847,620 B1 | * | 1/2005 | Meier | ........................ 370/328 |
| 7,286,533 B2 | * | 10/2007 | Mackiewich et al. | ........ 370/392 |
| 2002/0012345 A1 | * | 1/2002 | Kalkunte et al. | ............ 370/389 |
| 2003/0152075 A1 | * | 8/2003 | Hawthorne et al. | ......... 370/389 |

* cited by examiner

*Primary Examiner*—Hong Cho
(74) *Attorney, Agent, or Firm*—Steven A. Shaw; W. James Brady; Frederick J. Telecky, Jr.

(57) ABSTRACT

Congestion is minimized on a desired port in an Ethernet bridge. A packet with a destination address and a source address is received on an incoming port. An address table is search to determine a destination port associated with the destination address. If the destination port is not determined by the search then flooding the packet on all of the ports except the desired port if the incoming port is determined to be equal to the desired port; and flooding the packet on all of the ports except the incoming port and the desired port if the incoming port is determined to be not equal to the desired port.

20 Claims, 12 Drawing Sheets

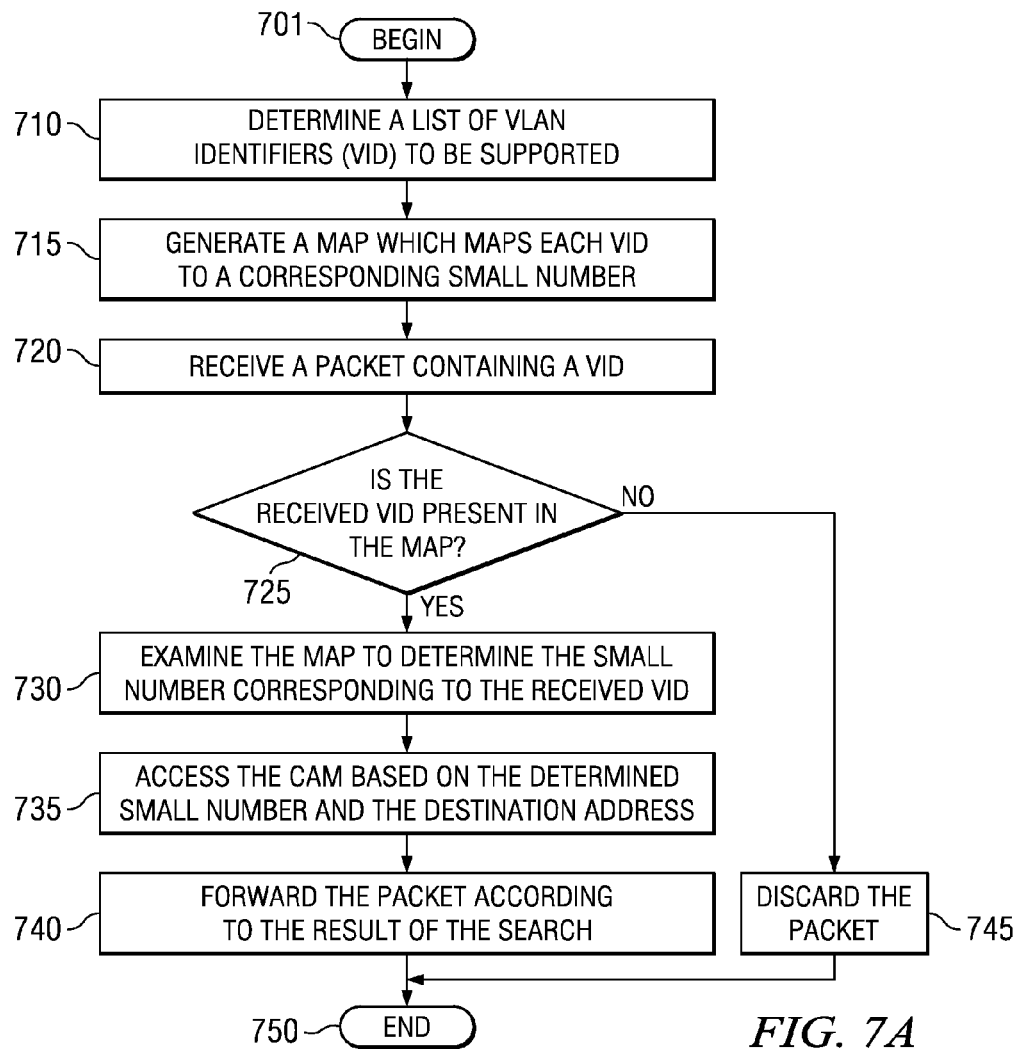

| SMALL NUMBER | MAC ADDRESS | PORT NUMBER | STATIC BIT | PRIORITY |
|---|---|---|---|---|
| - | A | 1 | - | - |
| - | B | 2 | - | - |

| SMALL NUMBER | MAC ADDRESS | PORT NUMBER | STATIC BIT | PRIORITY |
|---|---|---|---|---|
| - | A | 2 | - | - |
| - | B | 1 | - | - |

FLEXIBLE ETHERNET BRIDGE

BACKGROUND OF THE INVENTION

1. Field of the Invention

The present invention relates to communication networks, and more specifically to a method and apparatus for providing a flexible Ethernet bridge.

2. Related Art

Ethernet bridge generally refers to a system which transfers Ethernet packets from one network to the other based on operation at the layer-2 level of the Open Systems Interconnect (OSI) model. In general, an Ethernet bridge examines a destination address of an Ethernet packet to determine a specific one of potentially several ports, on which to forward the packet.

To facilitate such forwarding on a single port where possible, Ethernet bridges generally maintain an address table indicating the specific port/direction on which a machine with a specific Ethernet address is reachable/available. The address table is typically populated based on the source address (and the port on which the packet is received) of each Ethernet packet received, as is well known in the relevant arts. While forwarding an Ethernet packet, if the destination address is not present in the table, the packet may be forwarded on all ports, and is often referred to as flooding.

Ethernet bridges often need to be implemented supporting several requirements. For example, it may be required to reduce the cost of an Ethernet bridge at least in situation in which the Ethernet bridge is integrated with devices such as IP phones and DSL routers. In addition, an Ethernet bridge may need to support features such as Virtual LANs (VLANS), which generally minimizes unneeded flooding and/or broadcast packets across all LANs.

BRIEF DESCRIPTION OF THE DRAWINGS

The present invention will be described with reference to the following accompanying drawings.

FIG. 6 is a table illustrating the details of a map table which contains mapping of a small number to a VLAN identifier (VID) in an embodiment of the present invention.

FIG. 7A is a flow chart illustrating an approach by which the available CAM width may be used efficiently according to an aspect of the present invention.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

Figure 1:
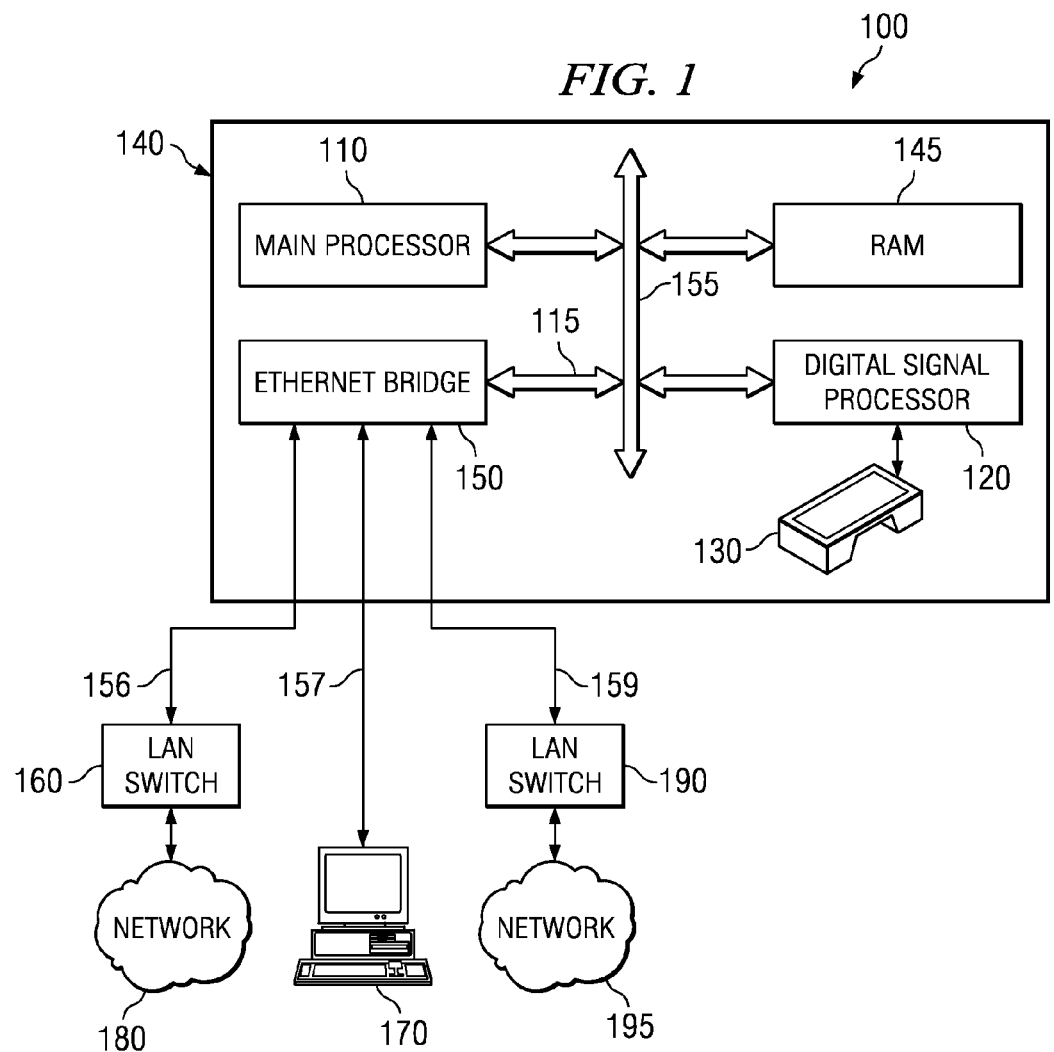
FIG. 1 is a block diagram illustrating the details of an example environment in which the present invention can be implemented.

An aspect of the present invention enables an Ethernet bridge to operate either in VLAN aware mode or VLAN unaware mode. In an embodiment, the Ethernet bridge receives configuration data indicating whether to operate in VLAN aware mode or unaware mode, and forwards each packet accordingly. For example, if the bridge is configured to operate in VLAN unaware mode, only the destination address of a packet may be used to determine the specific port on which to forward a packet. If the bridge is configured to operate in VLAN aware mode, each packet is forwarded according to VLAN technology (i.e., generally based on VLAN identifier (VID) and the destination address).

Another aspect of the present invention enables a layer-2 bridge to use available CAM width efficiently by generating a map table which maps each VID supported to a corresponding small number. For example, assuming that a maximum of sixteen VLANs are supported in the layer-2 bridge, only a 4 bit small number need to be stored in CAM instead of 12-bit VID, thereby making available the remaining 8 bits for other purposes. The learning approach (i.e., populating address table) and forwarding approach (lookup for determining the port to forward on) need to be implemented consistent with the use of such map table.

Yet another aspect of the present invention minimizes the overall flooding by enabling a user to specify a high priority associated with a port (e.g., an internal port from which data related to voice over IP is expected to be received). Entries in the address table (used to determine the destination port on which to forward a packet), corresponding to the Ethernet addresses communicating with machines on the high priority port, are provided a high priority such that the entries are less likely to be replaced compared to entries of lower priority. As a result, such high priority entries are more likely to be present in the address table (when a lookup for a destination port is performed), and flooding is consequently minimized. Such a feature is particularly useful for small sized address tables.

One more aspect of the present invention corrects the address table quickly if an Ethernet address moves so as to be reachable from a different port. For example, if the wires connecting to the ports are switched to different ports during operation, the Ethernet addresses already learned (and thus present in the address table) would be reachable from different ports. An aspect of the present invention enables the address table to be quickly modified such that the address table contains the correct information. In an embodiment, a CAM containing the address table is accessed based on the source address of each received packet, and if the port number of the accessed entry is different from the incoming port, the accessed entry in the address table is updated to indicate that the corresponding Ethernet address is accessible on the incoming port of the packet.

Another aspect of the present invention minimizes flooding on a desired port. In an embodiment in which the Ethernet bridge is integrated in a device, the desired port corresponds to an internal port which is used to forward/receive packets to/from another processor contained within the device. In an embodiment, flooding is minimized by permanently storing in an address table the addresses reachable on the Internal port. Alternatively, the list of addresses accessible on the desired port may be maintained, and such a list may be examined before making a decision to flood the packet on all the ports other than the incoming port and the desired port.

One more aspect of the present invention enables packets related to bridge protocols to be processed in a timely manner. In an embodiment, a processor contained within a Ethernet bridge determines a specific port on which to forward a packet. If the packet relates to a bridge protocol that needs to be processed by the Ethernet bridge itself, the packet is forwarded using a higher priority DMA channel on an internal port to a main processor. The main processor generates any necessary responses to the packet. Due to the high priority forwarding, the responses may be generated in a timely manner.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

FIG. 1 is a block diagram illustrating the details of an example environment in which the present invention can be implemented. Example environment 100 is shown containing networks 180 and 195, local area network (LAN) switches 160 and 190, personal computer (PC) 170, and internet protocol (IP) phone 140. The environment is shown containing only a few representative components for illustration. In reality, each environment typically contains many more components. For example, IP phone 140 may be connected to other IP phones. Each block is described below in further detail.

Networks 180 and 195, along with LAN switches 160/190 and IP phone 140, provide connectivity between various machines (including PC 170 and telephone integrated within IP phone 140) using appropriate protocols. For simplicity, it is assumed that all the networks, LAN switches and IP phone operate at Layer-2 level with respect to packet format and forwarding. Thus, paths 156, 157 and 159 are described as transferring layer-2 or Ethernet packets.

PC 170 may be used to execute various user applications, generating data packets to be transferred to other machines. PC 170 may be used to receive voice calls terminating at IP phone 140, and also to initiate voice calls.

IP phone 140 represents an example device in which an Ethernet bridge is provided according to various aspects of the present invention. IP phone 140 is shown connected to networks 180 and 195 through LAN switches 160 and 190 on paths 156 and 159 respectively. In addition, IP phone 140 is shown connected to PC 170 on path 157.

IP phone 140 may be used to place a voice call on various machines connected to networks 180 and 195. Typically, a user can use internet (through PC 170) to access the data/services, and IP phone 140 for voice calls simultaneously, while using a shared path (156, 157 and 159) based on Internet Protocol. In addition, IP phone 140 operates as an Ethernet bridge with respect to packets received on paths 156, 157 and 159 as described below in further detail.

3. IP Phone

IP phone 140 of FIG. 1 is shown containing main processor 110, digital signal processor (DSP) 120, handset 130, RAM 145, and Ethernet bridge 150. Bus 155 provides the connectivity between the components. Each component is described below in further detail.

Handset 130 may contain a micro-phone and loud-speaker, with the micro-phone operating to provide electrical signals (either analog or digital) representing incident voice. The loud-speaker generate audible voice signals based on electrical signals received from DSP 120. Handset 130 may be implemented in a known way.

DSP 120 converts voice data received from RAM 145 into corresponding electrical signals, which are passed to handset 130 for production as audible voice. Similarly, DSP 120 converts electrical signals received from handset into a data stream, and stores the data stream in RAM 145. RAM 145 stores the data stream received from DSP 120 as well as the packets received from main processor 110. DSP 120 may also be implemented in a known way.

Main processor 110 forwards the data stream in the form of Ethernet packets through bus 155 to Ethernet bridge 150. In addition, main processor 110 receives Ethernet packets through bus 155 and processes each packet according to the packet content. The packets (voice data) corresponding to voice calls are forwarded to RAM 145, which are then provided to DSP 120 through bus 155. Main processor 110 may receive packets related to various bridge protocols (e.g., spanning tree protocol), and processes the received packets according to protocol specification.

Ethernet bridge 150 receives Ethernet packets on paths 156, 157, 159 and 115. Each received packet is either discarded or forwarded on one of more of the paths 115, 156, 157 and 159 (other than path/port on which the packet is received), according to various aspects of the present invention. By offloading main processor 110 of the load associated with forwarding of packets, the processing capacity within main processor 110 may be made available to other user applications. The description is continued with reference to the details of an embodiment of Ethernet bridge 150.

4. Ethernet Bridge

Figure 2:
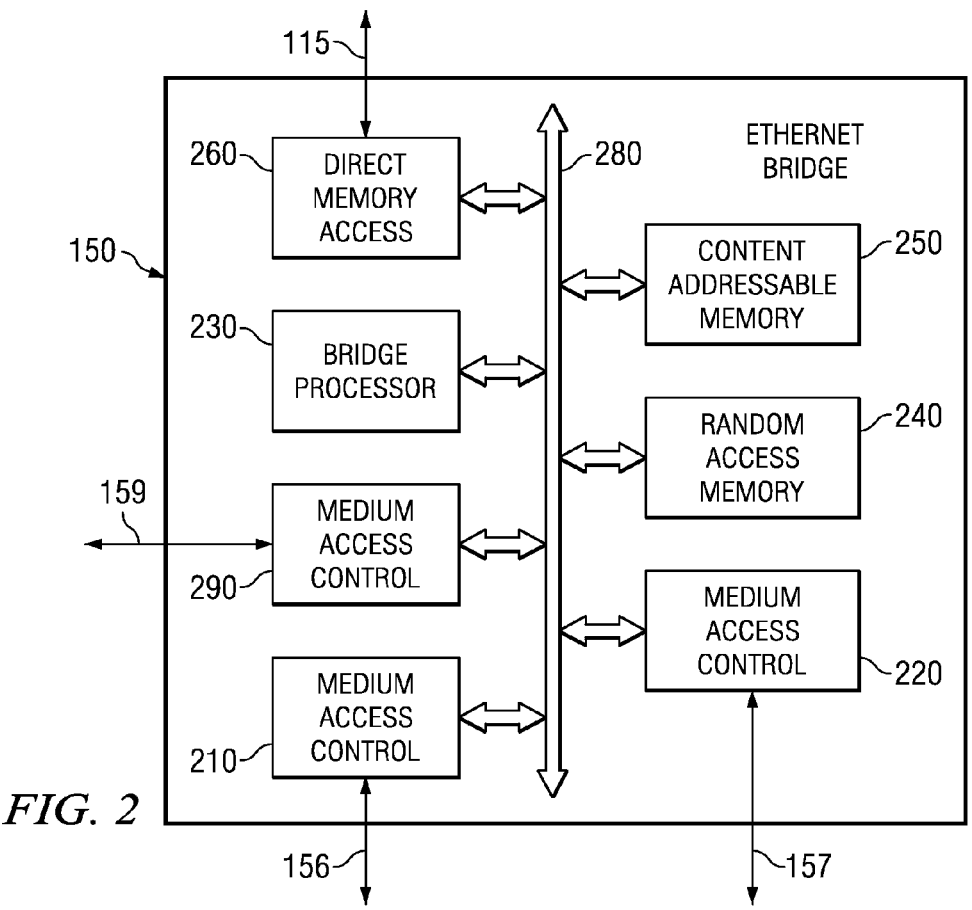
FIG. 2 is a block diagram illustrating the details of an Ethernet bridge in an embodiment of the present invention.

FIG. 2 is a block diagram illustrating the details of Ethernet bridge 150 in an embodiment of the present invention. For illustration, Ethernet bridge 150 is shown integrated in IP phone 140, however, Ethernet bridge 150 can be implemented as a stand-alone unit or integrated in other types (e.g., DSL routers, home appliances) of devices. Ethernet bridge 150 is shown containing medium access control blocks (MACs) 210, 220 and 290, bridge processor 230, random access memory (RAM) 240, content addressable memory (CAM) 250, direct memory access (DMA) 260, and internal bus 280. Each component is described in further detail below.

MACs 210, 220 and 290 receive Ethernet packets on respective paths 156, 157 and and 159 and store the received packet in RAM 240 through internal bus 280. Similarly, each MAC receives Ethernet packets from RAM 240 according to decisions on forwarding performed by bridge processor 230, and transmits the received packet on the corresponding external path. Each path may be logically viewed as being connected to a corresponding port, and thus path and port are used interchangeably in the present application.

CAM 250 provides storage for an address table, which indicates the specific port/direction in which a machine with each Ethernet address is present. The table may be viewed as containing multiple entries/rows, with each row containing information for a single address. The entries in the table are generally populated based on the source address in each received packet and a port on which the packet is received, but can be populated by other approaches (e.g., user configuration) as well. An example address table is described in section(s) below.

Continuing with reference to FIG. 2, DMA 260 enables packet data to be retrieved without substantial overhead on bridge processor 230, while transferring a packet in RAM 240 to main processor 110. Similarly, DMA 260 transfers packets from RAM 145 to RAM 240.

Bridge processor 230 performs various tasks such as populating (by "learning" based on source addresses of received packets) CAM 250, discarding and forwarding of received packets according to various aspects of the present invention as described in sections below. While bridge processor 230 is described as a single unit in the embodiments described below, multiple units can be employed (with some units potentially employed for specialized tasks), and such units together are referred to as a processing unit (containing one or more processors).

5. Supporting Both VLAN Aware Mode and VLAN Unaware Mode

5.A. General Introduction

Virtual LAN (VLAN) technology generally enables a logical LAN (referred to as "VLAN") to be created on a large LAN. The VLAN can potentially span different portions of the large LAN, and VLAN technology is generally intended to prevent a VLAN from receiving packets not related to the VLAN.

Thus, in an example forwarding scenario, when the destination address of a received VLAN packet is not present in an address table of a bridge, the packet may be forwarded only on the port(s) which are in the path of the specific VLAN the packet is related to. As a result, unneeded "flooding" (forwarding on all ports, except the port on which the packet is received) may be prevented to various portions of the network.

Similarly, the VLAN technology can be used to control the specific portions of a large LAN any broadcast packets eventually reach, etc. Several other benefits (such as security, access control) may be attained using VLAN technology. Accordingly, there is a general need to support VLAN technologies in a bridge.

It may be further desirable for a bridge to support non-VLAN technologies also. Non-VLAN technologies generally forward packets merely based on destination address, and thus may lead to unneeded packet flooding, etc., as is well known in the relevant arts. One reason for desirability of support for both VLAN and non-VLAN technologies is that a buyer (of the bridge) may wish to have the flexibility of using the same product unit either with VLAN-compliant environments or non-VLAN compliant environments.

An aspect of the present invention enables a bridge to support both VLAN and non-VLAN compliant technologies, as described below in further detail. First, it is helpful to understand example packet formats which indicate whether a packet is VLAN technology technology compliant or not.

5.B. Packet Formats

Figure 3A:
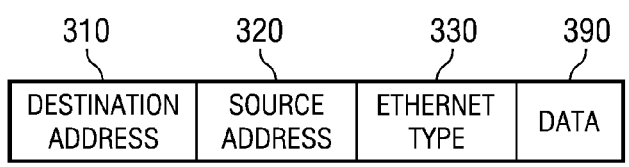
FIG. 3A is a table illustrating the details of packet format for a untagged type packet.
Figure 3B:
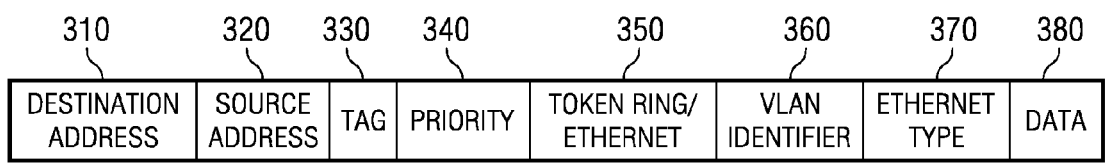
FIG. 3B is a table illustrating the details of packet format for a tagged type packet.

FIGS. 3A and 3B respectively illustrate the details of packet formats for VLAN untagged and VLAN tagged packets. Untagged packet in FIG. 3A is shown containing four fields 310, 320, 330, and 390 respectively containing destination address, source address, type, and data. As is well known, destination address indicates the address of a machine to which the packet has to be forwarded.

Source address indicates the address of a machine from which the packet is received. Type indicates the packet type (e.g., IP, Vines, DECnet, etc.). Data contains the information to be transferred consistent with the protocol specified in the packet type. The size of destination address and source address is 6 bytes each, and type field is 2 bytes.

FIG. 3B illustrates the format of VLAN tagged packet. Fields 310 and 320 contain the destination and source Ethernet addresses as above. Field 330 contains tag value (again 2 bytes) equaling '0x8100', indicating that the packet is VLAN technology compliant. In such a case, field 350 (1-bit) indicates whether the packet is related to token ring or Ethernet.

Field 360 (12 bits) contains an identifier which uniquely identifies the specific VLAN of which the packet is a part of. A value of 0 in field 360 indicates that the packet is priority tagged. Field 370 contains the Ethernet packet type (similar to field 330 of FIG. 3A). The manner in which a bridge may support VLAN aware or VLAN unaware modes according to various aspects of the present invention is described in sections below.

5.C. Approach

Figure 4A:
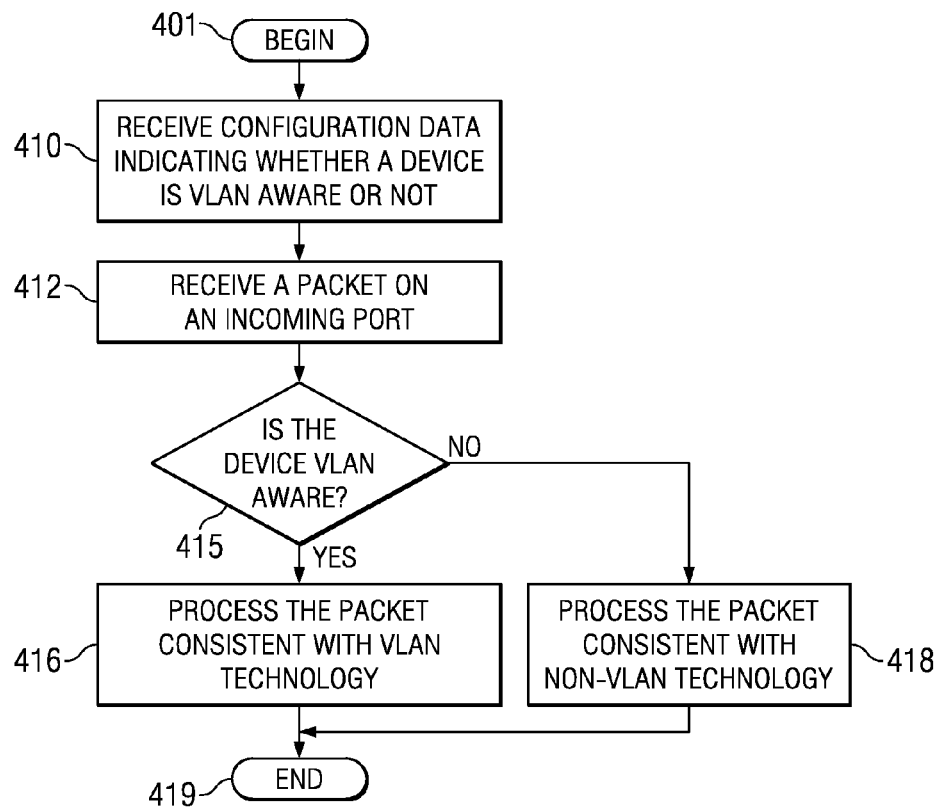
FIG. 4A is a flow chart illustrating the manner in which a bridge may support VLAN aware and unaware modes according to an aspect of the present invention.

FIG. 4A is a flow chart illustrating the manner in which a bridge may support VLAN aware and unaware modes according to an aspect of the present invention. The flow-chart is described with reference to the systems of FIGS. 1, 2, 3A and 3B for illustration. Various aspects of the invention can be implemented in other environments as well. The method begins in step 401, in which control immediately passes to step 410.

In step 410, bridge processor 230 receives configuration data indicating whether IP phone 140 is to operate in VLAN aware mode or VLAN unaware mode. The configuration data may be provided by a manufacturer while designing the device or later by a user during operation of Ethernet bridge 150. In general, the configuration data is stored in a non-volatile memory and made available to bridge processor 230 during operation of IP phone 140.

In an embodiment, IP phone 140 stores a bit, with the bit representing whether the device is configured to operate in either VLAN aware or unaware mode. For example, a logical value '1' in the stored bit represents VLAN aware mode and '0' represents VLAN unaware mode.

In step 412, a packet is received on a port ("incoming port"). The packet may then be stored in RAM 240. In step 415, bridge processor 230 determines whether the device is configured to operate in VLAN aware mode based on the data received in step 410. If the device is specified to operate in VLAN aware mode, the tag information in the packet (or some default value) generally needs to be used for further processing and accordingly control is transferred to step 416, else control is transferred to step 418.

In step 416, the packet is processed consistent with the VLAN technology, which is further described in a section below with reference to FIG. 4C. Control is then transferred to step 419. In step 418, the packet is processed consistent with the non-VLAN technology, which is further described in section below with reference to FIG. 4B. The method ends in step 419.

As noted above, the configuration data may be used to configure the device to operate in either VLAN aware or VLAN unaware mode as desired. Such a feature may provide a user the flexibility to use the device in either VLAN-compliant environments or non-VLAN compliant environments. The manner in which a packet may be processed in VLAN unaware mode is described below with reference to FIG. 4B.

5.E. VLAN Unaware Mode

Figure 4B:
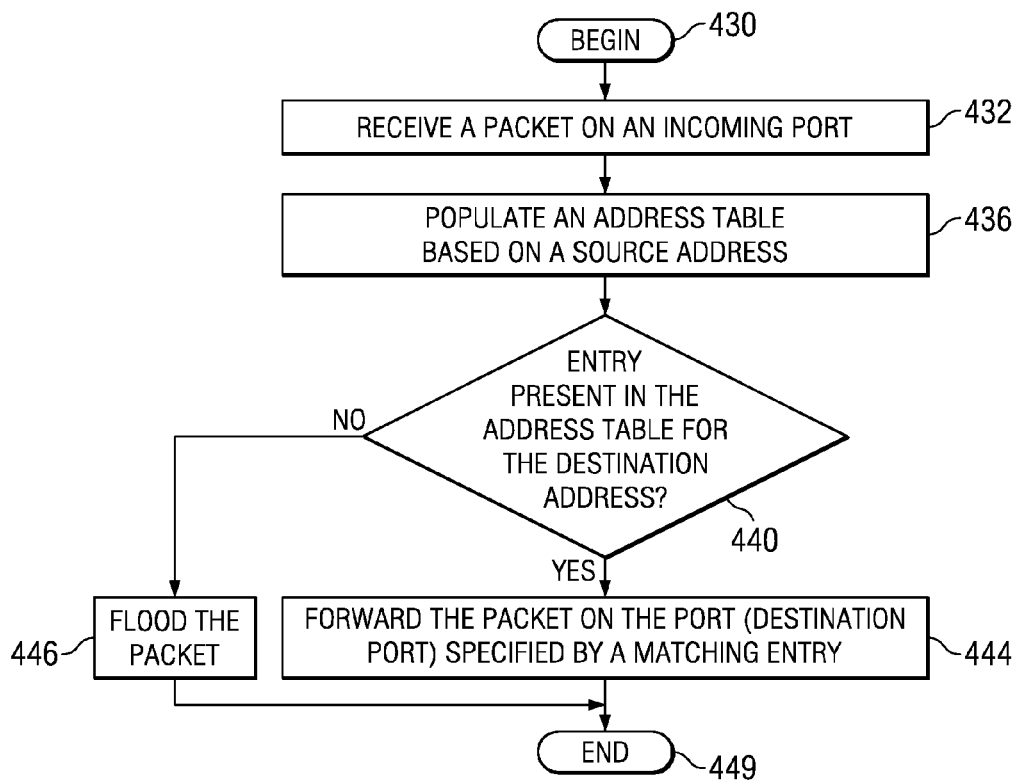
FIG. 4B is a flow chart illustrating the manner in which a packet may be processed if a device is configured to operate in VLAN unaware mode in an embodiment of the present invention.

FIG. 4B is a flow chart illustrating the manner in which a packet may be processed if a device is configured to operate in VLAN unaware mode in an embodiment of the present invention. The flow-chart is described with reference to the systems of FIGS. 1, 2, 3A and 3B for illustration. Various aspects of the invention can be implemented in other environments as well. The method begins in step 430, in which control immediately passes to step 432.

In step 432, a packet is received on an incoming port. The packet may then be stored in RAM 240. In step 436, an address table is populated based on the source address (of potentially several prior packets as well). The manner in which the address table may be populated is described in detail in section below. The address table is stored in CAM 250.

In step 440, bridge processor 230 determines whether an entry is present in the address table for the destination address. If the entry is present, control is transferred to step 444, else control is transferred to step 446.

In step 444, bridge processor 230 forwards the packet on the port specified by a matching entry. The matching entry provides the destination port on which the packet has to be forwarded. Control is then transferred to step 449. In step 446, bridge processor 230 floods the packet on all the ports (except the incoming port) as the destination port on which the packet has to be forwarded is not known. The method ends in step 449.

As may be appreciated from the above, if the device is configured to operate in VLAN unaware mode, both tagged (format described above with respect to FIG. 3B) and untagged packets (format described above with respect to FIG. 3A) may be processed in a similar manner. Learning (populating) of the address table is based on the source address and forwarding of the packet is based on destination address alone. With respect to processing of tagged packets, the tag information is ignored for processing. The manner in which a packet may be processed in VLAN aware mode is described below with reference to FIG. 4C.

5.F. VLAN Aware Mode

Figure 4C:
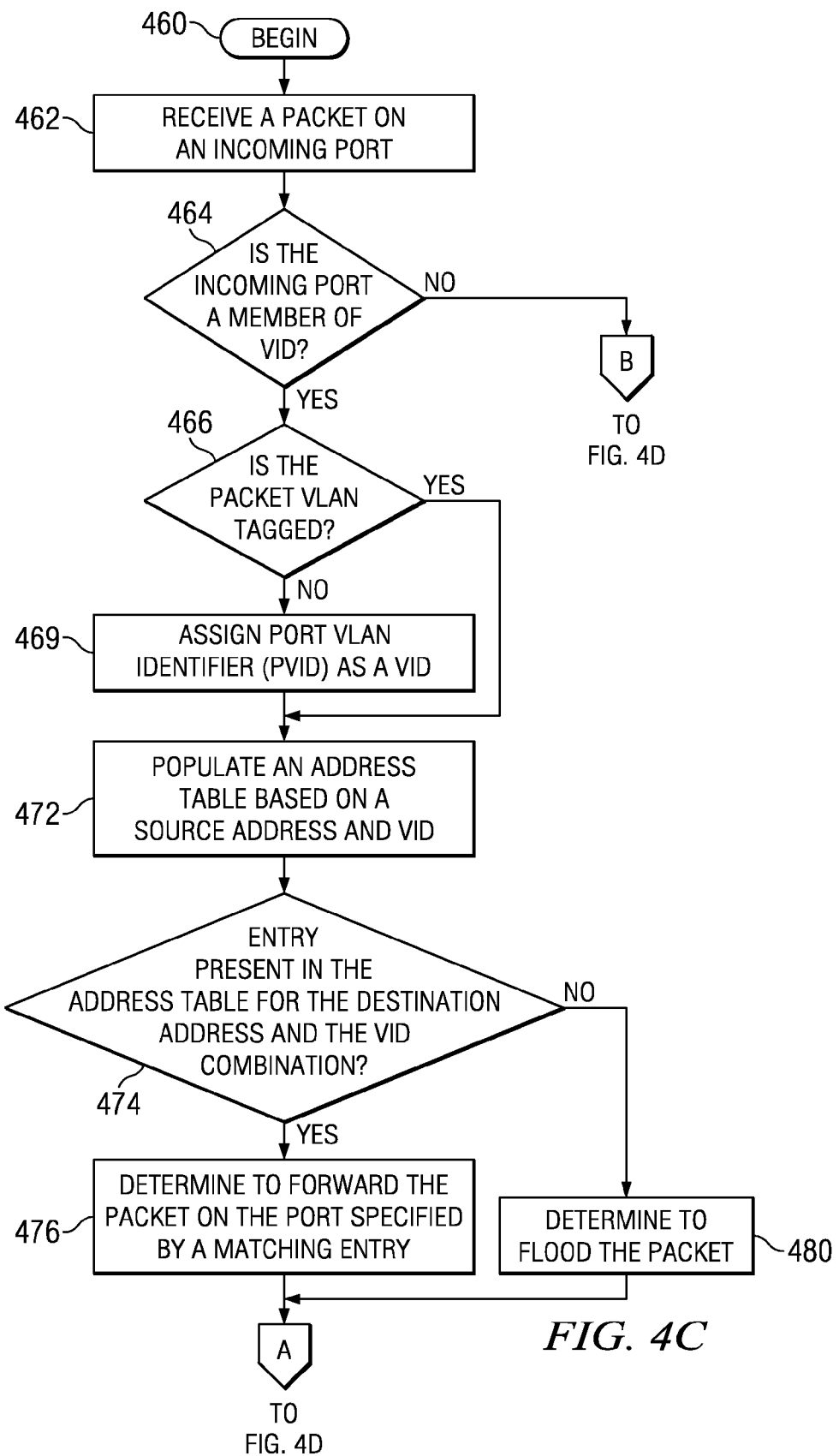
FIGS. 4C and 4D together contain a flow chart illustrating the manner in which a packet may be processed if a device is configured to operate in VLAN aware mode in an embodiment of the present invention.
Figure 4D:
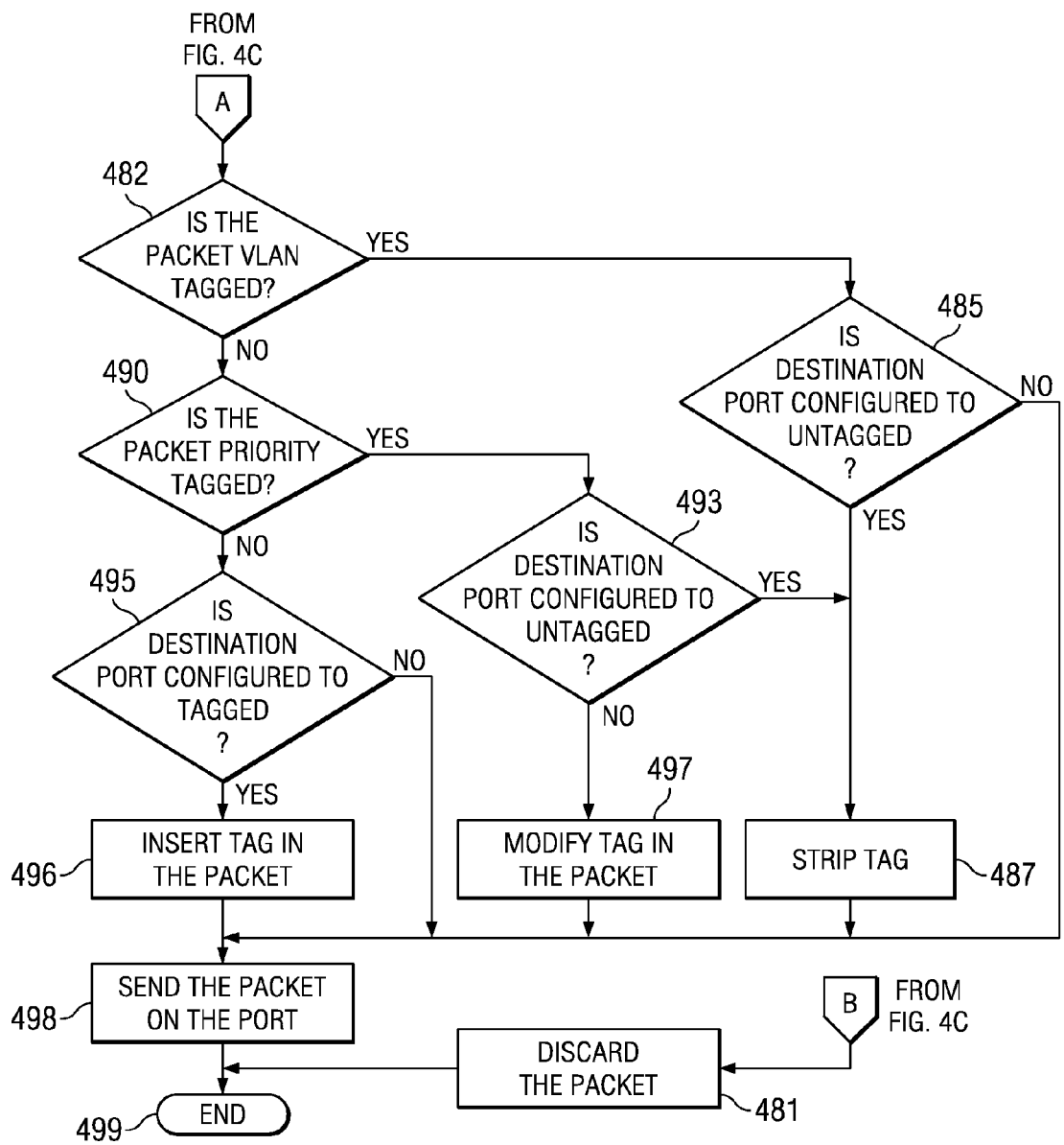

FIGS. 4C and 4D contain flow charts together illustrating the manner in which a packet may be processed if a device is configured to operate in VLAN aware mode in an embodiment of the present invention. The flow-chart is described with reference to the systems of FIGS. 1, 2, 3A and 3B for illustration. Various aspects of the invention can be implemented in other environments as well. The method begins in step 460, in which control immediately passes to step 462.

In step 462, a packet is received on an incoming port. The packet may then be stored in RAM 240. The packet contains tag information if the packet is tagged type. The tag information includes a VID, priority information, etc., as described above with reference to FIG. 3B.

In step 464, bridge processor 230 determines whether the incoming port is a member of the VLAN corresponding to the VID. The VIDs associated with each port may be determined based on user configuration, or by operating consistent with various learning protocols well known in the relevant arts.

In an embodiment, a VLAN port membership table is maintained indicating the specific ports which form part of each VLAN, and the VLAN port membership table is examined to determine whether the incoming port is a member of the VLAN corresponding to the VID. Control is transferred to step 466 if the incoming port is a member of the VLAN, else control is transferred to step 481 (via connector B). In step 481, bridge processor 230 discards the packet and control is then transferred to step 499.

In step 466, bridge processor 230 determines whether the packet is VLAN tagged or not (based on the value in bytes 13 and 14, as described above with reference to FIGS. 3A and 3B). Control is transferred to step 472 if the packet is VLAN tagged, else control is transferred to step 469.

In step 469, bridge processor 230 assigns port VLAN identifier (PVID) as a VID for the packet (which is either untagged or priority tagged). Accordingly, a PVID is assigned to each port, with the PVID indicating a default VLAN from which the packets may be received on the specific port. If the packet is untagged, the packet does not contain VID information, and assigning PVID as a VID enables the CAM search to be consistent with the searches in case of VLAN tagged packets as described in sections below.

In the case of priority tagged packets, the packet contains VID field equaling 0, which is not a valid VID. Similar to untagged packets, assigning PVID as a VID enables the CAM search to be consistent with the searches in case of VLAN tagged packets as described in sections below.

In step 472, an address table may be populated based on the source address and VID (if the corresponding entry is already not present). The VID is received in the packet if the packet is VLAN tagged, else PVID is assigned as VID as described above in step 469. The address table is stored in CAM 250.

In step 474, bridge processor 230 determines whether an entry is present in the address table for the destination address and the VID combination. If the entry is present, control is transferred to step 476, else control is transferred to step 480.

In step 476, bridge processor 230 determines to forward the packet on the port ("destination port") specified by a matching entry. The matching entry provides the destination port on which the packet has to be forwarded. Control is then transferred to step 482 (via connector A).

In step 480, bridge processor 230 determines to flood the packet on all the ports ("destination ports") (except the incoming port) which are configured as a part of the VLAN. That is, if the address table does not contain an entry with the destination address and VLAN ID, the destination port on which the packet has to be forwarded is not known. Thus, the packet is determined to be flooded on all the ports which connect to portions of the VLAN. Control is then transferred to step 482 (via connector A).

Once a decision is made to forward a packet on a specific port, the manner in which packets may sent/forwarded is described below with reference to FIG. 4D. Thus, if a packet is to be flooded on multiple ports, the steps of FIG. 4D may need to be executed multiple times. As described below, steps 482 to 497 relate to forwarding of each packet on the corresponding destination port(s) determined in steps of FIG. 4C.

In step 482, bridge processor 230 determines whether the packet is VLAN tagged or not (i.e., untagged or priority tagged). Control is transferred to step 485 if the packet is VLAN tagged, else control is transferred to step 490. In step 485, bridge processor 230 determines whether the destination port is configured for forwarding in untagged format or not. If the destination port is configured not to forward in untagged format, the packet is not modified. Control is transferred to step 487 if the destination port is configured for forwarding in untagged format, else control is transferred to step 499.

In step 487, the tag information in the received packet is stripped and the remaining fields in the packet are sent without any modifications. Checksum type computations may be performed in MAC 210/220/290. As described above with reference to FIG. 3B, the tag information is contained in fields 330, 340, 350 and 360. Control is then transferred to step 499.

In step 490, bridge processor 230 determines whether the packet is priority tagged or not. As noted above, a priority tagged packet is a tagged packet (field 330 equals '0x8100') with the VLAN identifier equaling 0. Control is transferred to step 493 if the packet is priority tagged, else control is transferred to step 495.

In step 493, bridge processor 230 determines whether the destination port is configured for forwarding in untagged format or not. Control is transferred to step 487 if the destination port is configured for forwarding in untagged format, else control is transferred to step 497.

In step 495, bridge processor 230 determines whether the destination port is configured for forwarding in tagged format or not. If the destination port is configured for forwarding in untagged format, the untagged packet is not modified. Accordingly, control is transferred to step 496 if the destination port is configured for forwarding in tagged tagged format, else control is transferred to step 498.

In step 496, bridge processor 230 inserts tag information in the packet. The tag information (of FIG. 3B) contains tag 330 of a value 0x8100, VLAN identifier 360 with the PVID value. Control is then transferred to step 498.

In step 497, bridge processor 230 modifies the tag information in the packet. VLAN identifier 360 (of FIG. 3B) is set to PVID value and the remaining fields are not changed. Control is transferred to step 498. In step 498, bridge processor 230 sends/forwards the packet on the destination port. Such forwarding may be performed in a known way. Control is transferred to step 499, in which the method ends.

As may be appreciated from the above, if the device is configured to operate in VLAN aware mode, learning of the address table is based on the source address and VID combination, and forwarding of the packet is based on destination address and VID combination. In case of untagged and priority tagged packets, VID is set to PVID value to enable the search to be consistent with tagged packets. With respect to processing of tagged packets, the tag information is modified based on the configuration of the destination port and the type of received packet as described above. The description is continued with reference to an efficient use of CAM size.

6. Using Available CAM Width Efficiently 6.A. General Introduction

As described above with reference to FIG. 2, CAM 250 provides storage for an address table containing multiple entries, with each entry in turn containing several fields. The CAMs generally need to provide sufficient number of bits in each row such that data related to all the fields of an address table can be stored.

For example, a device TNETV1050 (a product of Texas Instruments Incorporated, assignee of the subject patent application) contains an Ethernet bridge, which has a CAM length of 64 entries, each with 8 bytes (thus, CAM width being 8 bytes). An example address table with a width of 8 bytes is described below with reference to FIG. 5A.

Figure 5A:
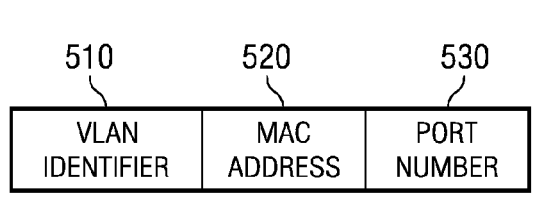
FIG. 5A contains the details of various fields in an entry of an address table in one prior embodiment.

FIG. 5A contains the details of various fields in entry 500 (of width 8 bytes) in an address table. The address table contains multiple such entries. Entry 500 is shown containing VLAN identifier (VID) 510, MAC address 520 and port number 530. Each field is described below in further detail.

VID 510 indicates the address of VLAN in which a machine (having an address of MAC address 520) is connected. VID 510 is shown represented with 12-bits (corresponding to width of field 360). MAC address 520 contains the address of a end system, and contains 6 bytes. Port number 530 indicates the port on which the packets with the destination address in MAC address 520 are to be forwarded. The width of port number field depends on number of ports connected to a device. In the example product noted above, port number 530 field contains only 3 bits as a maximum of 8 ports are supported.

It may be noted from the above that an address table using the format of entry 500 does not have enough additional width/memory to store much extra information such as priority, bridge ageing time, etc. Accordingly, CAM width of more than 8 bytes may be required in several environments.

Various approaches may be used to store such extra information when the CAM width is not sufficient. In one approach, the extra information is stored in some other location of CAM (or other memory). One problem with such an approach is reduced throughput performance in forwarding of packets due to the multiple accesses required to retrieve all the information.

In an alternative approach, such reduction of throughput performance is avoided by increasing the CAM width. Unfortunately, such solutions lead to increase in cost of overall solutions, which may be undesirable. What is therefore required is a method to use CAM width efficiently. The manner in which the CAM size may be used efficiently is described below with reference to FIGS. 5B, 6, 7A and 7B.

6.B. Principle

An aspect of the present invention takes advantage of the fact that only a few VLANs are typically used (or supported) within an Ethernet bridge at least in some environments. Thus, the 12-bit VIDs (of field 510) may be mapped to a small number, and only the small number can be stored in the address table stored in CAM 250. For example, assuming that a maximum of 16 VLANs are supported within Ethernet bridge 150, only a 4 bit small number need be stored in CAM, thereby making available the remaining 8 bits for other purposes.

Thus, additional map table 600 may be maintained indicating the small number corresponding to each VLAN identifier. Map 600 is shown containing two columns VID 610 and small number 620. For illustration, it is assumed that the number of VIDs supported is '8' and hence the number of bits required for the small number is '3'. Entries 630-1 through 630-8 represent the 12-bit VID numbers and entries 640-1 through 640-8 represent the corresponding mapped 3-bit small numbers. Thus, VLAN identifiers 1, 5, 9, 15, 205, 209, 1206, 4094 are respectively shown mapped to 1 to 8.

Figure 5B:
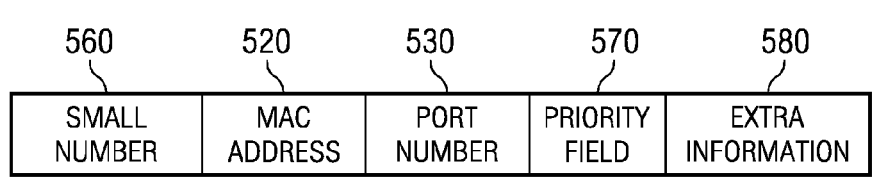
FIG. 5B depicts the details of various fields in an entry in an address table in an embodiment of the present invention.

The description is continued with reference to (FIG. 7A) the manner in which packets can be processed using map table 600, and then the manner in which the approach enables additional information to be stored in an address table without increasing the size increasing the size of CAM 250 (with reference to FIG. 5B).

6.C. Approach

FIG. 7A is a flow chart illustrating an approach by which the available CAM width may be used efficiently according to an aspect of the present invention. The flow-chart is described with reference to the systems of FIGS. 1 and 2, and assuming that the relevant ports are configured to operate in VLAN aware mode for illustration. Various aspects of the invention can be implemented in other environments as well. The approach begins in step 701, in which control immediately passes to step 710.

In step 710, bridge processor 230 may determine a list of VLAN identifiers (VID) to be supported by IP phone 140. Each VLAN is identified with an unique identifier, and contains 12 bits when a VLAN technology is operating according to the format described above with reference to FIG. 3B. As described above, the VIDs may be determined based on user configuration or interfacing with various learning protocols, as would be apparent to one skilled in the relevant arts.

In step 715, bridge processor 230 generates a map table (e.g., with entries according to format of 600 describe above), which maps each VID to a corresponding small number. One of various well-known approaches may be used to generate the map table. For example, map table 600 is generated either by user configuration entity or dynamically such that the entries in the map table can be added or deleted any time during operation. In an embodiment, map table 600 is stored in CAM 250 for faster access of the mapping information. Alternatively, map table 600 may also be stored in RAM 240.

In step 720, bridge processor 230 receives a packet containing a VID on an incoming port. Steps 725, 730, and 735 together implement a search of the address table in such a scenario as described now. In step 725, bridge processor 230 determines whether an entry corresponding to the received VID is present in map table 600. If a matching entry is not present in map table 600, the packet is discarded in step 745 assuming that the packet is not related to VLANs supported by Ethernet bridge 150. If a matching entry is present in map table 600, control is transferred to step 730.

In step 730, bridge processor 230 determines the small number corresponding to the received VID based on the matching entry. In step 735, bridge processor 230 accesses CAM 250 (or address table, in general) based on the determined small number and the destination address (contained in the received packet). The format of the corresponding address table in CAM 250 is described below with reference to FIG. 5B.

In step 740, bridge processor 230 forwards the packet according to the result of the search, for example, as described above with reference to steps 474 and 476 (on a single port as specified in the matching entry of step 735), and 474 and 480 (flooding) of FIG. 4C. Control is transferred to step 750, in which the flow-chart ends.

It may be noted that the above-description assumes that the address table according to the format of FIG. 5B is already populated. The approaches of populating also need to take into account the use of the small numbers. An example approach to populate the address table is described below with reference to FIG. 7B.

6.D. Populating Address Table

Figures 7B, 10, 11:
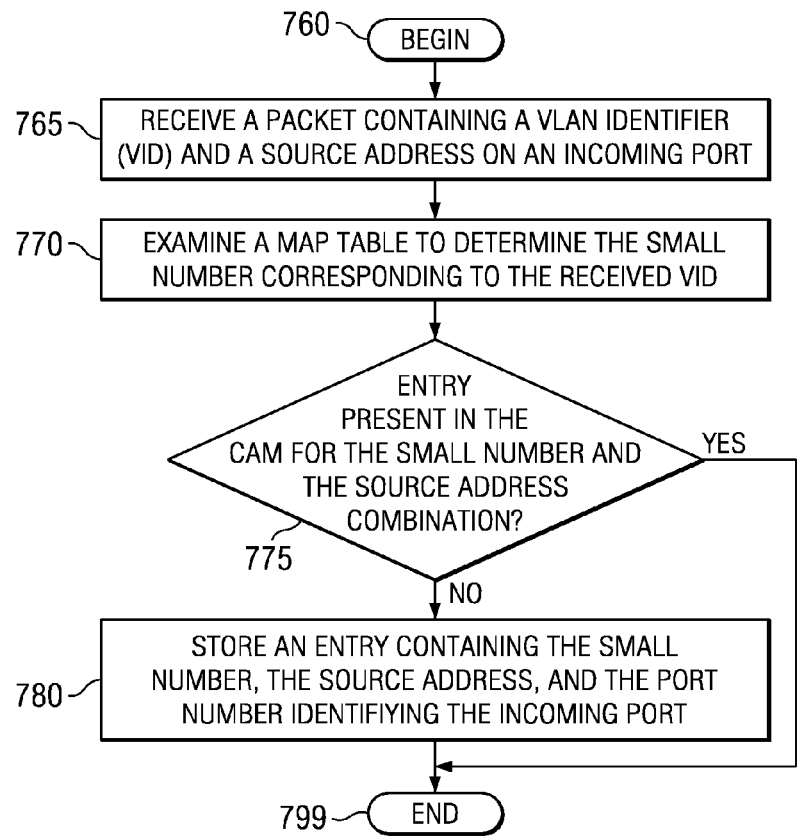
FIG. 7B is a flow chart illustrating an approach using which an address table may be populated while using CAM width efficiently according to an aspect of the present invention.
FIG. 10 is a table illustrating the details of corresponding entries in an address table when the port connections are normal.
FIG. 11 is a table illustrating the details of the desired updated entries in an address table after the port connections are switched.

FIG. 7B is a flow chart illustrating an approach using which an address table may be populated while using CAM width efficiently according to an aspect of the present invention. The flow-chart is described with reference to the systems of FIGS. 1 and 2, and assuming that the relevant ports are configured to operate in VLAN aware mode for illustration. Various aspects of the invention can be implemented in other environments as well. The approach begins in step 760, in which control immediately passes to step 765.

In step 765, bridge processor 230 receives a packet containing a VID and a source address (e.g., according to the format of FIG. 3B) on an incoming port. In step 770, bridge processor 230 examines a map table to determine the small number corresponding to the VID. If the small number is already not present, the packet may be discarded (not shown). An example entry 600 of the map table is described above.

In step 775, bridge processor 230 determines whether an entry is present in the address table for a combination of the small number and the source address. If a matching entry is already present, control is transferred to step 799, else control is transferred to step 780.

In step 780, bridge processor 230 stores (in the address table contained in CAM 250) an entry containing the small number, the source address, and the port number identifying the incoming port. The method ends in step 799.

From the above, it may be appreciated that an address table may be populated using a smaller number of bits for VLAN identifier within CAM 250. The resulting freed bits can be used for storing extra information as described below with reference to FIG. 5B.

6.E. CAM Entry Using Width Efficiently

FIG. 5B depicts the details of various fields in entry 550 (of width 8 bytes) in an address table in an embodiment of the present invention. The address table stored in CAM 250 would contain several such entries (potentially as many as the length of the CAM). Entry 550 is shown containing small number 560, MAC address 590, port number 595, priority field 570, and extra information 580. Each field in entry 550 is described below in further detail.

Small number 560 stores the number mapped (similar to column 620) to represent a VID. MAC address 590 indicates the address of a machine similar to field 520 of FIG. 5A. Port number 595 (similar to field 530) indicates the port on which packets destined to a machine with MAC address 590 are to be forwarded.

Priority field 570 may be used to control replacement strategies when a CAM entry needs to be replaced with information related to another Ethernet address (potentially with VLAN combination). An aspect of the present invention uses this field, as described in a section below with reference to FIG. 8.

Extra information 580 is stored using the additional bits made available due to the use of VID to small number mapping described above. In an embodiment, the extra information contains an ageing counter (which represents the duration lapsed since the entry was last accessed), and a static field (which indicates whether to permit ageing or not). Static field may contain a single bit, and a value of 1 indicates that the entry can be considered for ageing, and a 0 indicates that the entry can not be aged out (removed).

The age counter for each entry may be increased with a fixed period. An entry may be aged out if a pre-specified high value is reached. In addition, while a new address is is being learned, an entry with a high counter value may be replaced with an entry corresponding to the new address.

Thus, an aspect of the present invention allows the CAM width to be used efficiently, and the additional bits available as a result can be used to store extra information. The manner in which the same CAM may be used both in VLAN aware and VLAN unaware modes is described below.

6.F. Supporting the Use of Same CAM Both in VLAN Aware and Unaware Modes

It may be noted that the address table stored in the CAM needs to be searched based on MAC (source or destination) address alone in VLAN unaware mode as described above with reference to FIG. 4B. In VLAN aware mode, the CAM needs to be searched based on the combination of MAC address and VID as described above with reference to FIG. 4C.

Thus, it may be observed that the fields to be searched are different for VLAN aware and unaware modes.

The CAM may need to enable the search to be done with different fields in VLAN aware mode and unaware mode. In an embodiment, the CAM is implemented with a mask, which can be used to optionally include VLAN identifier field in searches, thereby enabling usage of a single unit for the searches. One problem with such an embodiment is that the CAM with a mask is expensive. An aspect of the present invention may enable the use of the same CAM (without mask) both in VLAN aware and unaware modes as described below.

According to an aspect of the present invention, even when using Ethernet bridge 150 in unaware mode, the address table is used consistent with the format of entry 500 of FIG. 5A. In other words, even though untagged packets do not contain VLAN identifiers, field 510 is also included in the search table. The same value (e.g., 0) may be used for all the entries, and searches may be conducted based on the combination of the same value and the MAC address.

As a result, CAMs with the same search width (i.e., VLAN identifier and MAC address) can be used in both VLAN unaware and aware modes, thereby obviating the need for expensive CAMs with mask capability. In addition, such a feature may be used in combination with the small number feature described above with reference to FIGS. 5B, 6, 7A and 7B.

Thus, the same CAM (without mask) may be used to support address tables in both VLAN aware and unaware modes. The description is continued with reference to the manner in which flooding may be minimized according to an aspect of the present invention.

7. Minimizing Flooding in Case of Packets Communicating With High Priority Ports

7.A. General Introduction

As described above, the destination address (together with VLAN identifier in case of tagged packets) of a received packet is used to search an address table. If a matching entry is present, the packet is forwarded on the port specified by the matching entry. If a matching entry is not present, the packet is flooded, i.e., forwarded on all ports in case of non-VLAN technology and on port associated with the VLAN corresponding to the VID in the received packet in case of VLAN technology.

In general, it is desirable to minimize flooding to avoid unneeded load on portions of networks which are not on the path to a destination user system. Such a result may be particularly important in case a bridge uses a small address table (e.g., if CAM 250 is small).

An aspect of the present invention minimizes (or avoids) flooding of packets which are either destined to or originating from a high priority port. The feature(s) may be appreciated by understanding the disadvantages of an embodiment which does not implement such feature(s). Accordingly, an embodiment which does not implement the features is described first.

7.B. Embodiment in Which Undesirable Amount of Flooding Can Occur

For illustration, it is assumed that the connection from Ethernet bridge 150 to main processor 110 is also via a port (similar to the connections to LAN switches 160 and 190, and PC 170). It is further assumed that an external machine having an Ethernet address of A is communicating with applications executing on IP phone 140. If an entry corresponding to address A is not present in the address table (for whatever reason, e.g., ageing, lack of memory in the address table), the packets containing A in a destination address may be flooded.

Such flooding is particularly problematic when packets related to real-time applications are being processed. For example, main processor 110 may generate a sequence of packets representing voice communication, and the packets may need to be quickly transmitted soon after being generated (at least to maintain continuity of the audible voice signal when reproduced on the other end).

Before the address A is learned (and placed in the address table), the sequence of packets may continue to be flooded. Many packets may be flooded to different portion of a network as a result, and is therefore undesirable. At least for such a reason, it may be desirable to minimize flooding. The manner in which flooding may be minimized is described below with reference to FIG. 8.

7.C. Approach

Figure 8:
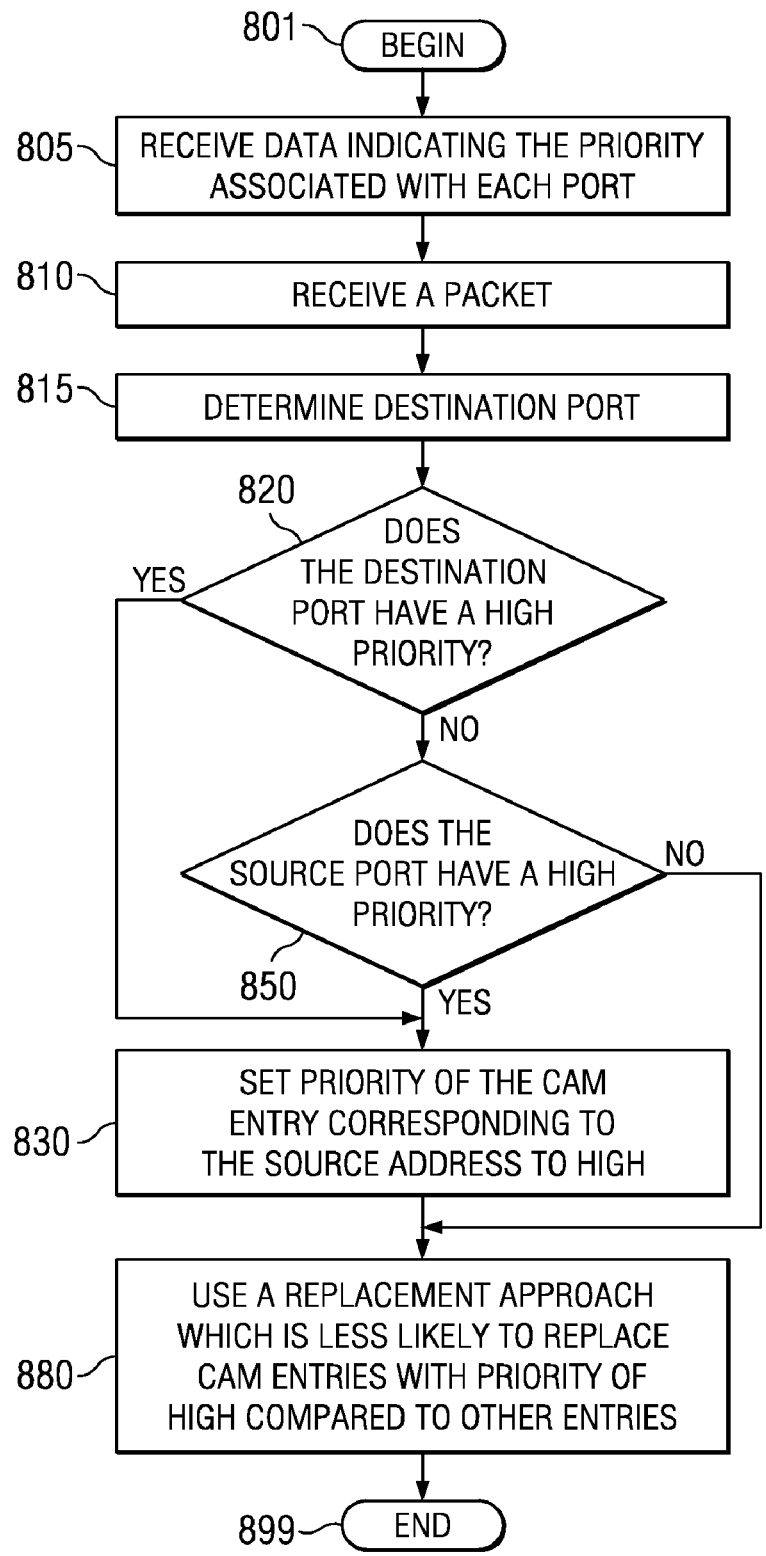
FIG. 8 is a flow chart illustrating the manner in which packet flooding may be minimized according to an aspect of the present invention.

FIG. 8 is a flow chart illustrating the manner in which packet flooding may be minimized according to an aspect of the present invention. The flow-chart is described with reference to the systems of FIGS. 1 and 2 for illustration. Various aspects of the invention can be implemented in other environments as well. The method begins in step 801, in which control immediately passes to step 805.

In step 805, bridge processor 230 receives data indicating whether each port is configured to have a high priority or a low priority. The data may be provided by a manufacturer while designing the device or by a user later. In an embodiment, Ethernet bridge 150 stores a bit corresponding to each port, with the bit representing whether the port is configured to have high priority or low priority. For example, a logical value '1' in the stored bit represents high priority and '0' represents low priority.

In step 810, bridge processor 230 receives a packet on one of the ports (115, 156, 157, and 159). The packet may be stored in RAM 240. In step 815, bridge processor 230 determines the destination port by accessing CAM 250 using the destination address (and potentially the VID) contained in the packet header.

In step 820, bridge processor 230 determines whether the destination port has a high priority. The determination may be made based on the data received in step 805. Control is transferred to step 830 if the destination port has high priority, else control is transferred to step 850. In step 850, bridge processor 230 determines whether the port ("incoming port") on which the packet is received has a high priority. Control is transferred to step 830 if the incoming port has a high priority, else control is transferred to step 880.

In step 830, bridge processor 230 sets priority of the CAM entry corresponding to the source address to high. If an entry is not present for the source address, such an entry is created and indicated to be of a high priority. In general, when a CAM entry is created (as a part of learning) without satisfying the conditions of steps 820 and 850, the priority is set to low. In an embodiment, priority field 570 described above, contains a single bit which if set to 1 indicates a high priority, and a low priority otherwise. Control is then transferred to step 880.

In step 880, a replacement approach, which is less likely to replace CAM entries with a priority of HIGH compared to other entries, is used. In an embodiment, aged entries are first considered candidates for replacement (irrespective of whether the new entry to be added is of high or low priority). If there are no aged entries, a higher priority entry is permitted to replace a lower priority entry. If no low priority entries and aged out entries are present, a higher priority entry is not populated in the address table. However, alternative embodiments which use different approaches for replacement, can be implemented without departing from various aspects of the present invention. The method ends in step 899.

From the above, it may be appreciated that the addresses communicating with machines accessible by high priority ports are less likely to be replaced. As a result, the approach of FIG. 8 may minimize flooding of packets. For example, in the illustration example of the previous sub-section (7.B.), the CAM entry corresponding to address A may be provided a high priority by configuring the internal port to have a high priority, thereby reducing flooding. The description is continued with additional features according to various aspects of the present invention.

8. Re-establishing Communication When Ethernet Address Moves to a New Port

8.A. General Introduction

As noted above, an address table contains multiple entries, with each entry indicating the specific port on which a packet with a specific destination address is to be forwarded. However, there is the possibility that a Ethernet address (or device with the address) presently reachable via one port moves such that the Ethernet address is reachable by another port.

For example, the wires connecting to the ports may be switched (for example, when a user is moving IP phone 140) while leaving the bridge powered on, causing the Ethernet addresses previous reachable on one port to be reachable on different ports.

One problem with such a situation is that the address table entries would be pointing to the wrong paths for forwarding, at least immediately after the switch. As a result, the received packets may not be forwarded on the correct port or not forwarded at all.

In one prior approach, the entries in an address table are removed (timed out or aged out) periodically based on one of several conditions (e.g., non-reception of a packet with the corresponding source address for a pre-specified duration). Thus, once an entry is removed from the address table, the address may be 'learned' again, with the port number reflecting the correct configuration (after switching of the wires).

Unfortunately, such approaches may take an unacceptably long time to correct the address table, and a machine may need to send many packets within that time duration. An aspect of the present invention operates to reestablish communication for such machines quickly as described below in further detail.

8.B. Illustration of the Principle

Figure 9A:
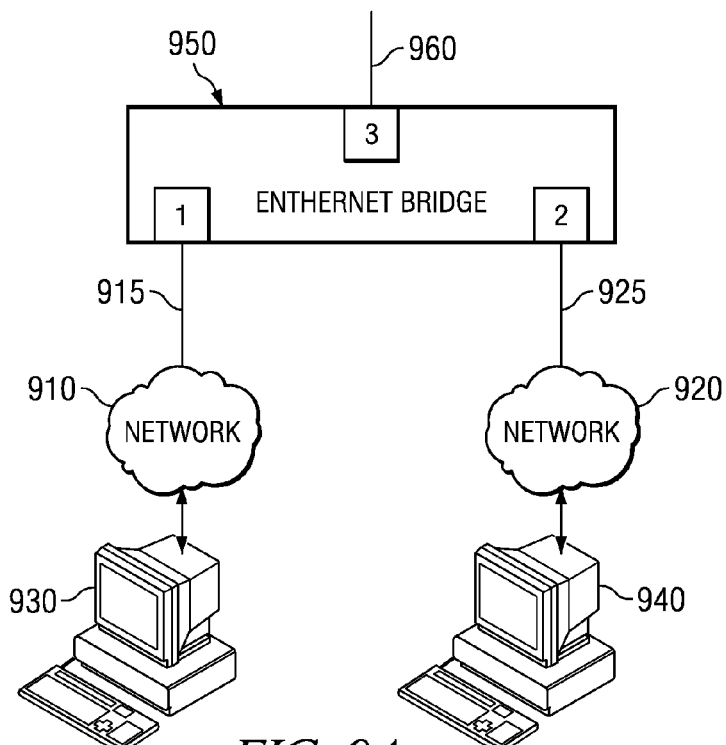
FIG. 9A illustrates the details of port connections to an Ethernet bridge in normal operation.

FIG. 9A illustrates the details of port connections to Ethernet bridge 950 in normal operation (without switching of wires) in an example embodiment. Ethernet bridge 950 is shown containing three ports 1, 2, and 3 for illustration. Port 1 is shown connecting to PC 930 through network 910 with wire 915 and port 2 is shown connecting to PC 940 through network 920 with wire 925.

FIG. 10 depicts address table 1000 containing the entries corresponding to FIG. 9A, assuming that the MAC addresses of PC 930 and PC 940 are 'A' and 'B' respectively. Thus, address table 1000 is shown containing row 1010 indicating an entry with MAC address 'A' is reachable via port number 1, and row 1050 indicating another entry with MAC address 'B' is reachable via port number 2. Address table 1000 may contain several other fields, but only the relevant fields are described for conciseness.

Figure 9B:
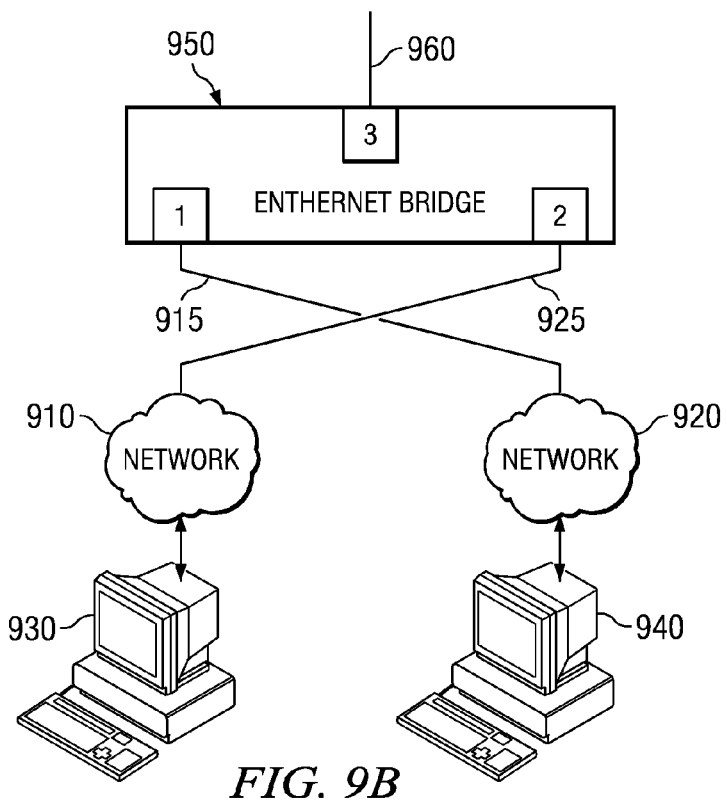
FIG. 9B illustrate the details of port connections when the connections to an Ethernet bridge are switched.

FIG. 9B illustrates the details of port connections when the wires (915 and 925) connecting to the ports of Ethernet bridge 950 are interchanged (or switched) compared to the configuration of FIG. 9A. The interchange causes PC 930 to be connected to port 2 and PC 940 to be connected to port 1. However, the corresponding entries in rows 1010 and 1050 remain the same at least immediately after the interchange.

In such a situation, if PC 930 tries to send an Ethernet packet to PC 940, the destination port in address table 1000 corresponding to MAC address 'B' is found to be 2 in row 1050. Since PC 930 is connected to port 2 and destination port is found to be same 2, the packet is discarded. Therefore, no communication may be possible between PCs 930 and 940 at least for some time.

FIG. 11 illustrates the details of the desired address table which would restore the desired connectivity between PCs 930 and 940. Row 1110 indicates PC 930 (MAC address 'A') is connected to port 2 and row 1150 indicates PC 940 (MAC address 'B') is connected to port 1. Thus, rows 1110 and 1150 respectively indicate the correct port numbers after switching the wire connections.

Once the address table is thus corrected (compared to FIG. 10), connectivity would be re-established between PCs 930 and 940. An aspect of the present invention attains such correction as described below with reference to FIG. 12.

8.C. Approach

Figure 12:
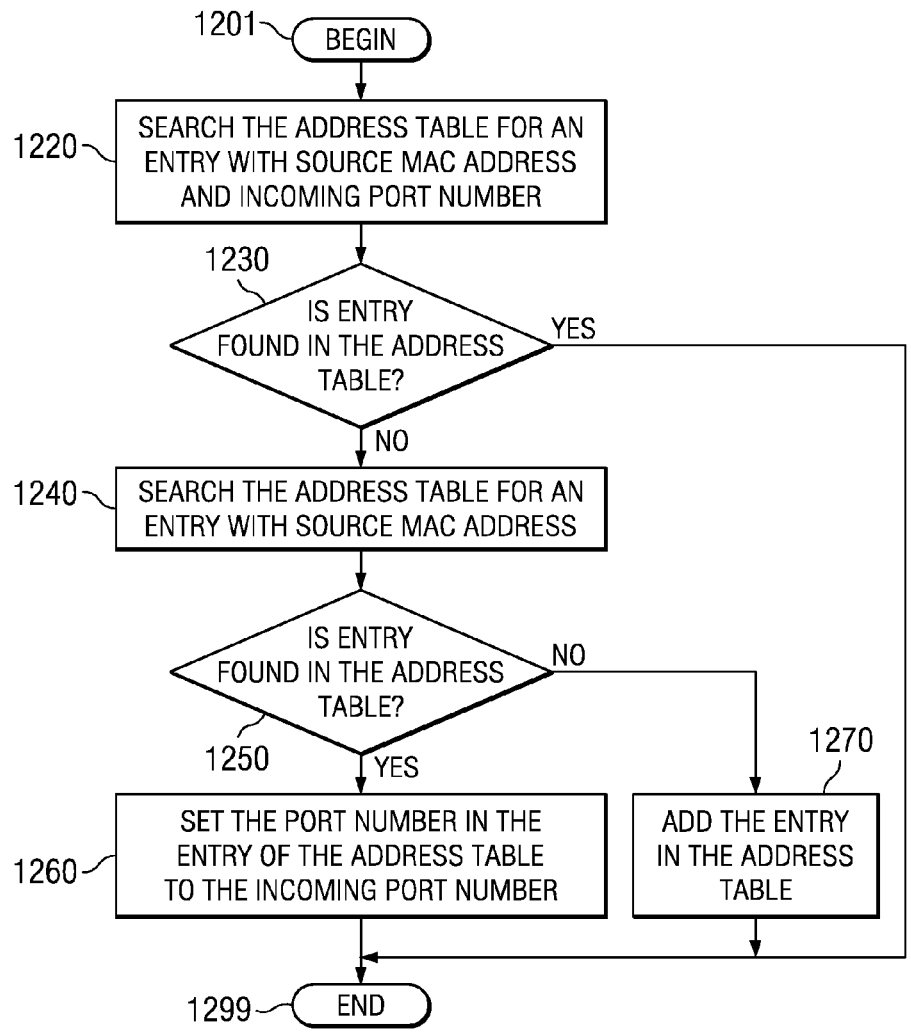
FIG. 12 is a flow chart illustrating the manner in which communication may be established quickly according to an aspect of the present invention when a machine with a MAC address becomes reachable on a different port.

FIG. 12 is a flow chart illustrating an approach by which communication is re-established (when wires connected to ports are switched) according to an aspect of the present invention. However, the approach may be used in several other situations, for example, if a portable wireless device is carried from one location to another. The flow-chart is described with reference to FIGS. 1, 2, 9B, 10 and 11 assuming that Ethernet bridge 950 corresponds to Ethernet bridge 150 for illustration. However, the approach can be implemented in other environments as well.

For illustration, with reference to the problem illustrated above in related to FIG. 9B, the packet is assumed to be received from PC 930 (source address A) on port 2, and destined to PC 940 (destination address B). The method begins in step 1201, in which control immediately passes to step 1220.

In step 1220, the address table is searched for an entry with source MAC address and the incoming port number. In step 1230, control is transferred to step 1299 if the entry is found, or else control is transferred to step 1240. In the illustrative example, table 1000 is searched for a combination of address A and port number 2. A matching entry would not be found, and thus control is transferred to step 1240.

In step 1240, the address table is searched for an entry with the source MAC address. In step 1250, control is transferred to step 1260 if the entry is found, or else control is transferred to step 1270. In the illustrative example, table 1000 is searched for address A and control is transferred to step 1260 as the matching entry is found. It may be appreciated that control is transferred to step 1260 only if the address table contains a wrong port number of a source MAC address, and thus the entry is modified in step 1260 to correct the port number.

In step 1260, bridge processor 230 sets the port number in the entry of the address table to the incoming port number. In the illustrative example, the port number in row 1010 of table 1000 is updated to source port 2, the updated entry is shown in row 1110 of FIG. 11. Control is then transferred to step 1299.

In step 1270, bridge processor 230 adds the entry in the address table. If the entry is not present in address table, a new entry with source MAC address and incoming port number is added in the address table. The packet may then be forwarded, if necessary, according to the information in the address table.

In the illustrative example, table 1000 is searched for destination address B and the destination port is found to be 2, which is the same as incoming port number. However, the machine (PC 940) with address B is connected on port 1. The port number corresponding to the destination address B is updated when PC 940 starts sending packets.

Assuming that PC 940 (address B) on port 1 tries to send a packet to PC 930 on port 2, the entry corresponding to the combination of address B and port 1 (as described above in steps 1220 and 1230) is not found in address table 1000. The entry with address B is found (steps 1240 and 1250) and thus the port number in row 1050 of table 1000 is updated to source port 1 (step 1260), the updated entry is shown in row 1150 of FIG. 11. 11. The method ends in step 1299

From the above, it may be appreciated that communication may be quickly established due to the correction of the port numbers. The description is continued with an approach to minimize congestion on ports.

9. Minimizing Flooding on Desired Ports

9.A. General Introduction

When a packet is received on a port, the destination address of a received packet is used to search the address table for a matching entry. The packet is forwarded on the port specified by the port number in the matching entry if the entry is found. If the entry is not found, the packet is flooded on all other ports which may cause congestion on all such other ports.

It may be desirable to minimize flooding at least on some ports. For example, with reference to FIG. 1, it may be desirable to minimize flooding on the port corresponding to path 115 since the path may be used for receiving/sending packets related to real time applications (e.g., voice calls). As path 115 may be used for communication only with main processor 110, the path may be available to transfer packets related to real-time applications by minimizing flooding (on this port). Therefore, the manner in which the packet may be flooded to reduce congestion on ports is described below with reference to FIG. 13.

9.B. Approach

Figure 13:
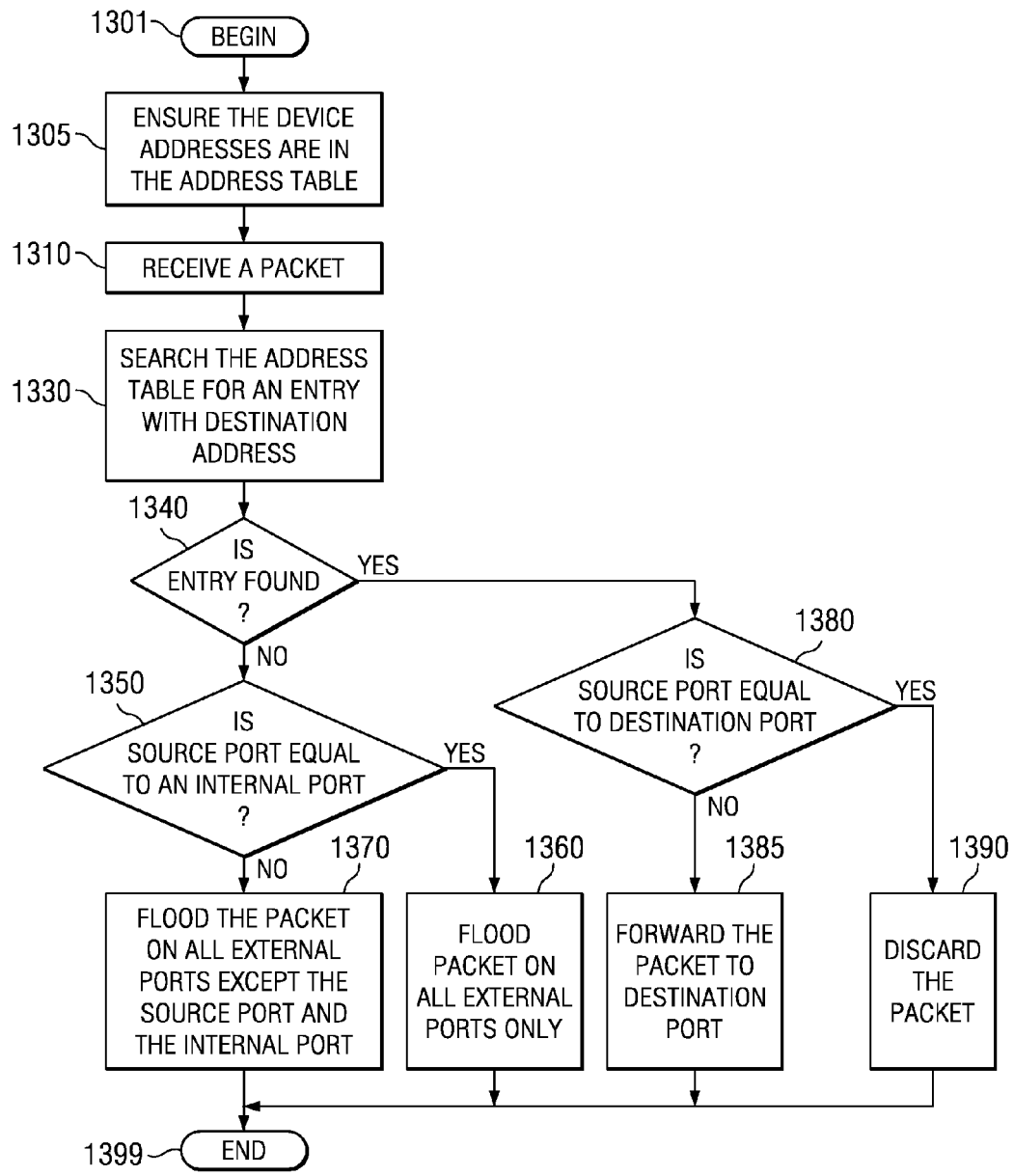
FIG. 13 is a flow chart illustrating the manner in which flooding is minimized on a desired port according to an aspect of the present invention.

FIG. 13 is a flow chart illustrating the manner in which packet flooding may be avoided on specific desired ports (e.g., internal port) according to an aspect of the present invention. The flow-chart is described with reference to the systems of FIGS. 1 and 2 for illustration. Various aspects of the invention can be implemented in other environments as environments as well. The method begins in step 1301, in which control immediately passes to step 1305.

In step 1305, bridge processor 230 may ensure that the device addresses (i.e., the addresses assigned to IP phone 140) are present in the address table. For example, the static bit described above with reference to extra information 580 (of FIG. 5B) may be set to indicate that the entries corresponding the device addresses need not be aged (and thus avoid removal from address table).

As will be appreciated from the description below, the presence of entries corresponding to the device addresses operates to avoid flooding of packets on the internal port if the packets are received from an external port. However, alternative approaches may be employed to confirm whether the destination address of a packet is not equal to any of the device addresses. For example, prior to forwarding on the internal port, software instructions (or firmware or hardware) may be used to check whether the destination address equals one of the device addresses, and not forward on the internal port if such equality is detected.

In step 1310, a packet is received on a source port. In step 1330, the address table is searched for an entry with the destination address. In step 1340, bridge processor 230 determines whether the entry in step 1330 is found in the address table. If the entry is found, control is transferred to step 1380, else control is transferred to step 1350.

In step 1350, bridge processor 230 determines whether the source port equals an internal port. With respect to FIG. 1, the internal port is a port on which Ethernet bridge 150 is connected to main processor 110. Control is transferred to step 1360 if the source port equals the internal port, and to step 1370 otherwise.

In step 1370, bridge processor 230 forwards the packet from an external port to all other external ports except the source port and internal port so that congestion is avoided on the internal port. In step 1360, bridge processor 230 forwards the packet from the internal port to all external ports. Control is then transferred to step 1399.

In step 1380, bridge processor 230 determines whether source port equals destination port. If an entry with destination address is found, bridge processor 230 forwards the packet on to the destination port instead of flooding on to all ports. Accordingly, if source port and destination port are different, control is transferred to Step 1385, else control is transferred to step 1390 in which the packet is discarded.

In step 1385, bridge processor 230 forwards the packet to the destination port and control is then transferred to step 1399 in which the method ends. As a result, flooding is minimized on the internal port. The description is continued with respect to supporting bridge protocols.

10. Supporting Bridge Protocols

10.A. General Introduction

Bridge protocols generally refer to a class of protocols which are used to configure various pieces of information (e.g., forwarding paths in case of redundancy, address tables, VLAN information) in the bridges. Examples of bridge protocols include spanning tree protocol (STP), GARP VLAN registration protocol (GVRP), and GARP multicast registration protocol (GMRP), etc.

Bridge protocols often require that packets be forwarded quickly. For example, STP protocol requires that a Hello packet be generated in response to a request (from a bridge, e.g., LAN switch 190, at the other end of a path) in a very short interval. If the response is not generated, the path may be determined to be non-operational, and the logical (tree) topology of the network may be reconfigured.

Such reconfiguration is generally undesirable at least in that packet (containing data of user applications) forwarding may be stopped temporarily and the overhead (in terms of additional load on the network) associated with the reconfiguration may also be undesirable. Accordingly, it may be desirable to forward packets related to bridge protocols quickly (so that the response can be generated in a timely fashion). An aspect of the present invention, uses DMA interface to provide higher priority to packets related to bridge protocols. Accordingly, DMA technology is described briefly first.

10.B. DMA Interface

As is well known, direct memory access (DMA) generally offloads a central processor from the burden of performing various memory operations such as reading/writing from/to memory. In a typical transaction, a central processor specifies the specific bytes (usually consecutive locations from a starting address) to be transferred from a memory, and the DMA completes the transfer without requiring much additional intervention from the central processor. Once the transfer is complete, the processing unit may be notified of completion of the transfer.

Thus, with reference to FIG. 2, DMA 260 offloads bridge processor 230 from the overhead of retrieving/storing packets from/into RAM 240. Similarly, DMA 260 offloads main processor 110 from the overhead of transferring packets between RAM 145 and RAM 240. Each packet is forwarded on one of the channels of DMA 260 as described below with reference to FIG. 14.

Figure 14:
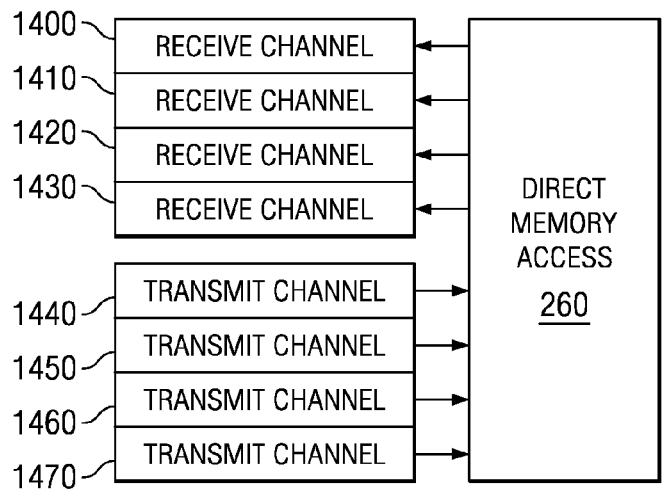
FIG. 14 is a block diagram illustrating the details of a direct memory access (DMA) interface.

FIG. 14 is a block diagram illustrating the details of operation of DMA 260. For illustration, the DMA is shown containing four receive channels 1400-1430 and four transmit channels 1440-1470. Channels 1400-1410 and 1440-1450 are assumed to be to main processor 110 on path 115, and channels 1420-1430 and 1460-1470 are assumed to be via path 280. However, DMA may contain more number of transmit and receive channels based on the design requirements.

Each channel may be operated with an associated priority. In an embodiment, the transfers on a lower priority channel are initiated only if there are no transfers pending on higher priority channels. In the illustrative example, it is assumed that channels 1400, 1420, 1440 and 1460 are assigned high priority, and channels 1410, 1430, 1450 and 1470 are assigned lower priority. The manner in which the priority of channels may be used to ensure packets related to bridge protocol packets are quickly transferred, is described below with reference to FIG. 15.

10.C. Approach

Figure 15:
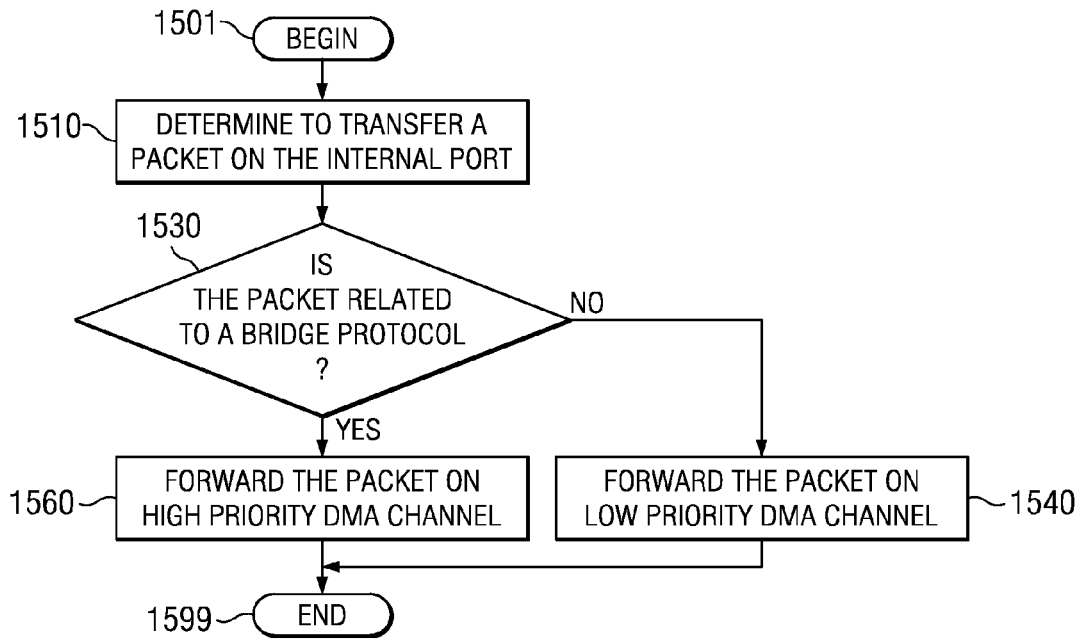
FIG. 15 is a flow chart illustrating the manner in which packets related to bridge protocols may be processed according to an aspect of the present invention.

FIG. 15 is a flow chart illustrating the manner in which packets related to bridge protocols are processed according to an aspect of the present invention. The flow-chart is described with reference to the systems of FIGS. 1 and 2 for illustration. Various aspects of the invention can be implemented in other environments as well. The method begins in step 1501, in which control immediately passes to step 1510.

In step 1510, bridge processor 230 determines to transfer a packet (stored in RAM 240) on an internal port. Some example approaches to determine whether to transfer a packet on an internal port are described in sections above. However, in general, the decision to forward is based on the destination MAC address (and VID in case of VLAN aware mode).

In step 1530, bridge processor 230 determines whether the packet relates to a bridge protocol, which requires quick processing of packets. In general, the packet header (e.g., the destination address determines whether a packet is related to spanning tree protocol) indicates whether each received packet relates to a bridge protocol of interest. If the packet is related to a bridge protocol of interest, control is transferred to step 1540, else control is transferred to step 1560.

In step 1540, the packet (unrelated to a bridge protocol) is forwarded on a low priority DMA channel such that bridge protocol packets are transmitted first than application packets. If the packet is related to a bridge protocol, bridge processor 230 forwards the packet on a high priority DMA channel in step 1560. Due to the higher priority, any responses for the bridge protocols may be quickly generated (by main processor 110) and forwarded within any applicable time limits. Control is then transferred to step 1599. The method ends in step 1599.

Thus, various aspects of the present invention described above can be used to provide a flexible Ethernet bridge which may be integrated into other devices or used stand-alone. It should be understood that the different components of an Ethernet bridge can be implemented in a combination of one or more of hardware, software and firmware. In general, when throughput performance is of primary consideration, the implementation is performed more in hardware (e.g., in the form of an application specific integrated circuit).

When cost is of primary consideration, the implementation is performed more in software (e.g., using a processor executing instructions provided in software/firmware). Cost and performance can be balanced by implementing Ethernet bridge 150 with a desired mix of hardware, software and/or firmware. An embodiment implemented substantially in software is described below.

11. Software Implementation

Figure 16:
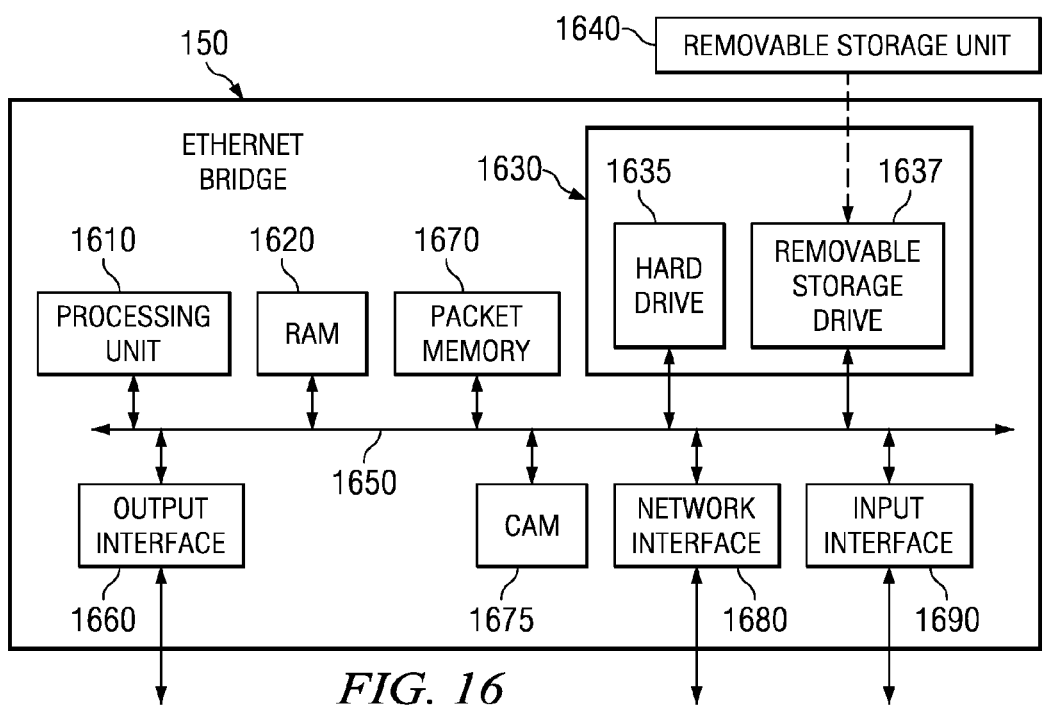
FIG. 16 is a block diagram illustrating the details of the Ethernet bridge in one embodiment.

FIG. 16 is a block diagram illustrating the details of Ethernet bridge 150 in one embodiment. Ethernet bridge 150 is shown containing processing unit 1610, random access memory (RAM) 1620, secondary memory 1630, output interface 1660, packet memory 1670, content addressable memory 1675, network interface 1680 and input interface 1690. Each component is described in further detail below.

Input interface 1690 (e.g., interface with a key-board and/or mouse, not shown) enables a user/administrator to provide any necessary inputs (e.g., configuration data to be used to configure the device to operate in either VLAN aware or unaware mode) to Ethernet bridge 150. Output interface 1660 provides output signals (e.g., display signals to a display unit, not shown), and the two interfaces together can form the basis for a suitable user interface for an administrator to interact with Ethernet bridge 150.

Network interface 1680 may enable Ethernet bridge 150 to send/receive Ethernet packets to/from other systems (140, 160, 170, and 190) on corresponding paths using protocols such as internet protocol (IP). Network interface 1680 may provide MAC interface to send/receive Ethernet packets on different ports of Ethernet bridge 150. Network interface 1680, output interface 1660 and input interface 1690 can be implemented in a known way.

RAM 1620, secondary memory 1630, packet memory 1670, and CAM 1675 may together be referred to as a memory. RAM 1620 receives instructions and data on path 1650 (which may represent several buses) from secondary memory 1630, and provides the instructions to processing unit 1610 for execution.

Packet memory 1670 stores (queues) the received packets waiting to be forwarded (or otherwise processed) on different ports. CAM 1675 provides high speed memory access while storing an address table and a map table. Secondary memory 1630 may contain units such as hard drive 1635 and removable storage drive 1637. Secondary memory 1630 may store the software instructions and data, which enable Ethernet bridge 150 to provide several features in accordance with the present invention.

Some or all of the data and instructions may be provided on removable storage unit 1640 (or from a network using protocols such as Internet Protocol), and the data and instructions may be read and provided by removable storage drive 1637 to processing unit 1610. Floppy drive, magnetic tape drive, CD_ROM drive, DVD Drive, Flash memory, removable memory chip (PCMCIA Card, EPROM) are examples of such removable storage drive 1637.

Processing unit 1610 may contain one or more processors. Some of the processors can be general purpose processors which execute instructions provided from RAM 1620. Some can be special purpose processors adapted for specific tasks (e.g., for searching entries in CAM 1675). The special purpose processors may also be provided instructions from RAM 1620.

In general, processing unit 1610 reads sequences of instructions from various types of memory medium (including RAM 1620, storage 1630 and removable storage unit 1640), and executes the instructions to provide various features of the present invention described above.

While various features of the present invention are described above with reference to Ethernet technology for illustration, it may be appreciated that at least some of features may be implemented in other layer-2 environments (e.g., token ring), as will be apparent to one skilled in the relevant arts by reading the disclosure provided herein. Such implementations are also covered by various aspects of the present invention.

12. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of minimizing congestion on a desired port in a layer-2 bridge, said desired port being contained in a plurality of ports comprised in said layer-2 bridge, said layer-2 bridge using an address table containing a plurality of entries, each of said plurality of entries specifying one of said plurality of ports on which packets containing a corresponding destination address are to be forwarded, said method comprising:

receiving a packet on an incoming port, said packet containing a destination address and a source address;

searching said address table to determine a destination port associated with said destination address on which to forward said packet;

if said destination port is not determined by said searching:

determining whether said incoming port equals said desired port;

flooding said packet on all of said ports except said desired port if said incoming port is determined to be equal to said desired port; and flooding said packet on all of said ports except said incoming port and said desired port if said incoming port is determined to be not equal to said desired port.

2. The method of claim 1, further comprising storing in said address table entries corresponding to all addresses reachable on said desired port.

3. The method of claim 2, wherein said layer-2 bridge is integrated in a device containing a main processor supporting user applications, wherein said desired port comprises an internal port which couples said layer-2 bridge to said main processor.

4. The method of claim 1, further comprising:

determining whether said incoming port equals said destination port if said destination port is determined;

forwarding said packet on said destination port if said incoming port is determined as not equal to said destination port; and discarding said packet if said incoming port is determined as equal to said destination port.

5. The method of claim 1, wherein said layer-2 bridge comprises an Ethernet bridge.

6. An apparatus for minimizing congestion on a desired port in a layer-2 bridge, said desired port being contained in a plurality of ports comprised in said layer-2 bridge, said layer-2 bridge using an address table containing a plurality of entries, each of said plurality of entries specifying one of said plurality of ports on which packets containing a corresponding destination address are to be forwarded, said apparatus comprising:

means for receiving a packet on an incoming port, said packet containing a destination address and a source address;

means for searching said address table to determine a destination port associated with said destination address on which to forward said packet;

if said destination port is not determined by said means for searching:

means for determining whether said incoming port equals said desired port;

means for flooding said packet on all of said ports except said desired port if said incoming port is determined to be equal to said desired port; and means for flooding said packet on all of said ports except said incoming port and said desired port if said incoming port is determined to be not equal to said desired port.

7. The apparatus of claim 6, further comprising means for storing in said address table entries corresponding to all addresses reachable on said desired port.

8. The apparatus of claim 7, wherein said layer-2 bridge is integrated in a device containing a main processor supporting user applications, wherein said desired port comprises an internal port which couples said layer-2 bridge to said main processor.

9. The apparatus of claim 6, further comprising:

means for determining whether said incoming port equals said destination port if said destination port is determined;

means for forwarding said packet on said destination port if said incoming port is determined as not equal to said destination port; and means for discarding said packet if said incoming port is determined as equal to said destination port.

10. The apparatus of claim 6, wherein said layer-2 bridge comprises an Ethernet bridge.

11. A computer readable medium encoded with one or more sequences of instructions for minimizing congestion on a desired port in a layer-2 bridge, said desired port being contained in a plurality of ports comprised in said layer-2 bridge, said layer-2 bridge using an address table containing a plurality of entries, each of said plurality of entries specifying one of said plurality of ports on which packets containing a corresponding destination address are to be forwarded, wherein execution of said one or more sequences of instructions by one or more processors contained in said layer-2 bridge causes said one or more processors to perform the actions of:

receiving a packet on an incoming port, said packet containing a destination address;

searching said address table to determine a destination port associated with said destination address on which to forward said packet;

if said destination port is not determined by said searching:

determining whether said incoming port equals said desired port;

flooding said packet on all of said ports except said desired port if said incoming port is determined to be equal to said desired port; and flooding said packet on all of said ports except said incoming port and said desired port if said incoming port is determined to be not equal to said desired port.

12. The computer readable medium of claim 11, further comprising storing in said address table entries corresponding to all addresses reachable on said desired port.

13. The computer readable medium of claim 12, wherein said layer-2 bridge is integrated in a device containing a main processor supporting user applications, wherein said desired port comprises an internal port which couples said layer-2 bridge to said main processor.

14. The computer readable medium of claim 11, further comprising:

determining whether said incoming port equals said destination port if said destination port is determined;

forwarding said packet on said destination port if said incoming port is determined as not equal to said destination port; and discarding said packet if said incoming port is determined as equal to said destination port.

15. The computer readable medium of claim 11, wherein said layer-2 bridge comprises an Ethernet bridge.

16. A layer-2 bridge operable to provide reduced flooding on a desired port, said desired port being contained in a plurality of ports comprised in said layer-2 bridge, said layer-2 bridge comprising:

a content addressable memory (CAM) storing an address table containing a plurality of entries, each of said plurality of entries specifying one of said plurality of ports on which packets containing a corresponding destination address are to be forwarded;

a medium access control (MAC) block receiving a packet on an incoming port, said packet containing a destination address;

a processing unit searching said address table to determine a destination port associated with said destination address on which to forward said first packet, if said destination port is not determined by said searching, said processing unit determining whether said incoming port equals said desired port and flooding said packet on all of said ports except said desired port if said incoming port is determined to be equal to said desired port, said processing unit flooding said packet on all of said ports except said incoming port and said desired port if said incoming port is determined to be not equal to said desired port.

17. The layer-2 bridge of claim 16, wherein said processing unit stores in said address table entries corresponding to all addresses reachable on said desired port.

18. The layer-2 bridge of claim 17, wherein said layer-2 bridge is integrated in a device containing a main processor supporting user applications, wherein said desired port comprises an internal port which couples said layer-2 bridge to said main processor.

19. The layer-2 bridge of claim 16, wherein said processing unit is operable to:

determine whether said incoming port equals said destination port if said destination port is determined;

forward said packet on said destination port if said incoming port is determined as not equal to said destination port; and discard said packet if said incoming port is determined as equal to said destination port.

20. The layer-2 bridge of claim 16, wherein said layer-2 bridge comprises an Ethernet bridge.

* * * * *